US007496578B2

(12) United States Patent
O'Brien et al.

(10) Patent No.: US 7,496,578 B2
(45) Date of Patent: *Feb. 24, 2009

(54) SHARED INTERNET STORAGE RESOURCE, USER INTERFACE SYSTEM, AND METHOD

(75) Inventors: Brett B. O'Brien, Pacific Palisades, CA (US); Sean Whiteley, Los Angeles, CA (US); Lucas McGregor, Los Angeles, CA (US); Martin Hald, West Linn, OR (US)

(73) Assignee: AOL LLC, Dulles, VA (US)

( * ) Notice: Subject to any disclaimer, the term of this patent is extended or adjusted under 35 U.S.C. 154(b) by 300 days.

This patent is subject to a terminal disclaimer.

(21) Appl. No.: 11/089,397

(22) Filed: Mar. 24, 2005

(65) Prior Publication Data
US 2005/0171956 A1    Aug. 4, 2005

Related U.S. Application Data

(63) Continuation-in-part of application No. 10/073,775, filed on Feb. 11, 2002, now Pat. No. 6,985,927, which is a continuation of application No. 09/570,583, filed on May 12, 2000, now Pat. No. 6,351,776.

(60) Provisional application No. 60/163,626, filed on Nov. 4, 1999.

(51) Int. Cl.
*G06F 7/00* (2006.01)
*G06F 17/30* (2006.01)
*G06F 12/00* (2006.01)
*G06F 13/00* (2006.01)
*G06F 13/28* (2006.01)
*G06F 15/16* (2006.01)

(52) U.S. Cl. .................. 707/10; 709/201; 711/100
(58) Field of Classification Search ............ 707/1–10; 709/201–203, 217–219
See application file for complete search history.

(56) References Cited

U.S. PATENT DOCUMENTS

| 5,544,320 | A | 8/1996 | Konrad ................. 709/203 |
| 5,696,901 | A | 12/1997 | Konrad ................. 709/203 |

(Continued)

OTHER PUBLICATIONS

Publication of Patricia Seybold Group entitles, "Enterprise JavaBeans™ Technology, Server Component Model for the Java™ Platform," by Anne Thomas, Revised Dec. 1998, prepared for Sun Microsystems, Inc., 26 pp.

* cited by examiner

*Primary Examiner*—Hosain T Alam
*Assistant Examiner*—Shew-Fen Lin
(74) *Attorney, Agent, or Firm*—Cisio & Thomas, LLP

(57) ABSTRACT

The Shared Internet Storage Resource provides Internet-based file storage, retrieval, access, control, and manipulation for a user. Additionally, an easy-to-use user interface is provided both for a browser or stand-alone application. The entire method provides means by which users can establish, use, and maintain files on the Internet in a manner remote from their local computers yet in a manner that is similar to the file manipulation used on their local computers. A high capacity or other storage system is attached to the Internet via an optional internal network that also serves to generate and direct metadata regarding the stored files. A web server using a CGI, Java®-based, or other interface transmits and retrieves TCP/IP packets or other Internet information through a load balancer/firewall by using XML to wrap the data packets. File instructions may be transmitted over the Internet to the Shared Resource System. The user's account may be password protected so that only the user may access his or her files. On the user's side, a stand-alone client application or JavaScript object interpreted through a browser provide two means by which the XML or other markup language data stream may be received and put to use by the user. Internet-to-Internet file transfers may be effected by directly downloading to the user's account space.

4 Claims, 15 Drawing Sheets

U.S. PATENT DOCUMENTS

| | | | |
|---|---|---|---|
| 5,771,354 A | 6/1998 | Crawford | 709/229 |
| 5,861,883 A | 1/1999 | Cuomo et al. | 345/733 |
| 5,901,228 A | 5/1999 | Crawford | 705/34 |
| 5,940,823 A | 8/1999 | Schreiber et al. | 707/3 |
| 5,956,490 A | 9/1999 | Buchholz et al. | 709/245 |
| 5,987,454 A | 11/1999 | Hobbs | 707/4 |
| 5,987,506 A | 11/1999 | Carter et al. | 709/213 |
| 6,003,030 A | 12/1999 | Kenner et al. | 707/10 |
| 6,009,427 A | 12/1999 | Wolff | 707/10 |
| 6,009,433 A | 12/1999 | Kurano et al. | 707/100 |
| 6,014,651 A | 1/2000 | Crawford | 705/400 |
| 6,021,433 A | 2/2000 | Payne et al. | 709/219 |
| 6,028,605 A * | 2/2000 | Conrad et al. | 715/840 |
| 6,035,325 A | 3/2000 | Potts, Jr. | 709/203 |
| 6,049,877 A | 4/2000 | White | 713/201 |
| 6,061,798 A | 5/2000 | Coley et al. | 713/201 |
| 6,119,229 A | 9/2000 | Martinez et al. | 713/200 |
| 6,128,624 A | 10/2000 | Papierniak et al. | 707/104 |
| 6,128,627 A * | 10/2000 | Mattis et al. | 707/202 |
| 6,138,158 A | 10/2000 | Boyle et al. | 709/225 |
| 6,151,601 A * | 11/2000 | Papierniak et al. | 707/10 |
| 6,151,624 A * | 11/2000 | Teare et al. | 709/217 |
| 6,154,738 A * | 11/2000 | Call | 707/4 |
| 6,173,318 B1 | 1/2001 | Jackson et al. | 709/219 |
| 6,175,842 B1 | 1/2001 | Kirk et al. | 707/513 |
| 6,209,124 B1 * | 3/2001 | Vermeire et al. | 717/114 |
| 6,321,254 B1 | 11/2001 | Meyer et al. | 709/213 |
| 6,327,608 B1 * | 12/2001 | Dillingham | 709/203 |
| 6,333,931 B1 | 12/2001 | LaPier et al. | 370/385 |
| 6,973,455 B1 * | 12/2005 | Vahalia et al. | 707/8 |
| 2002/0133561 A1 | 9/2002 | O'Brien et al. | |

SHARED INTERNET STORAGE RESOURCE, USER INTERFACE SYSTEM, AND METHOD

CROSS-REFERENCES TO RELATED APPLICATIONS

This application is related U.S. Provisional Patent Application No. 60/163,626 filed Nov. 4, 1999. This application is a continuation-in-part of U.S. patent application Ser. No. 10/073,775 filed Feb. 11, 2002 now U.S. Pat. No. 6,985,927 entitled Shared Internet Storage Resource, User Interface System, And Method which is a continuation of U.S. patent application Ser. No. 09/570,583 filed May 12, 2000 entitled Shared Internet Storage Resource, User Interface System, And Method and which issued as U.S. Pat. No. 6,351,776 on Feb. 26, 2002. All applications to which the present application is related are incorporated herein by this reference thereto.

COPYRIGHT AUTHORIZATION

Portions of the disclosure of this patent document may contain material which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

BACKGROUND OF THE INVENTION

1. Field of the Invention

This invention relates to resources on computer networks, particularly the Internet, and more particularly to a file storage and retrieval system that is available worldwide via the Internet which additionally allows a direct transfer of Internet files to an Internet storage, retrieval, and sharing resource. The present invention acts in the manner of a "Internet hard disk" or "Internet hard drive" to provide online storage and retrieval resources for users.

2. Description of the Related Art

The Internet is the worldwide computer network making available a vast number of computer and information resources to institutions and individuals. A significant part of the Internet is the worldwide web that allows for web pages to be written in HTML and transmitted upon demand throughout the Internet. Recent developments have better established the use of XML (Extensible Markup Language) as a subset of SGML (Standard Generalized Markup Language, ISO standard 8879:1986). FTP (File Transfer Protocol) provides means by which files may be transferred over the Internet. All of these protocols are generally well known in the art, and collateral resources can easily be obtained to describe these further.

Additionally, portable programming systems such as Java®, JavaBeans, and JavaScript have been extensively developed with an anticipation of future portability across the vast network that is the Internet. Java®-related systems allow for object-oriented programming whereby objects or "beans" allow the passing of self-contained modules with associated processing methods that are used to act upon the accompanying data. Consequently, the "bean" can travel through a network and, under appropriate circumstances, have certain processes activated allowing manipulation of the information contained in the bean.

Advancements in Java®-related systems have given rise to the Enterprise JavaBean™ (EJB). The Enterprise JavaBean™ allows for clustering of servers such that the bean is given independence from specific servers on the system, yet can be activated or "instantiated" such that error recovery is easier, the system as a whole is more robust, and processing of the bean can be performed asynchronously so that all events do not have to happen at a pre-set time or serially/one after the other.

Enterprise JavaBeans™/EJBs allow serialization of beans. Such serialization allows the bean to be represented as a data stream of determined length. In essence, this is just a data file that is interpreted in the proper context, much the same as any electronic information file. Such serialization of the EJB allows it to be replicated and stored in case of catastrophic failure of a preferred server or the like.

If the server upon which the instantiated EJB dies, goes down, or fails, a previously replicated twin can be used to continue the process and allow for error recovery. More information about Enterprise JavaBeans™ technology can be found in the white paper, "Enterprise JavaBeans™ Technology: Server Component Model for the Java™ Platform" by Anne Thomas, revised December 1998, prepared for Sun Microsystems, Inc. and published/made available by the Patricia Seybold Group of Boston, Mass.

Due to the nature of new technologies, terms such as "bean" or "instantiated" may seem unfamiliar to those new to the pertinent art. Reasons for this include the difficulty of communicating quickly new and complex subjects as well as the good-humored nature of those who intensely pursue the establishment of new technology, particularly software systems. Consequently, for Java®-related systems, a coffee theme is often present that indicates to those knowledgeable in the art the general subject matter of interest. While distinctions may be subtle in the art, they can be very important and serve the ends of those attempting to establish, share, and forward the technology.

Generally, home pages or other web pages are requested by the user through designation of the URL (Uniform Resource Locator). With the transmission to the user via TCP/IP protocol, the information present at the URL (and generally a file located somewhere on a computer) is transmitted to the user. The file may have links, or pointers, to other resources including images, graphics, audio or video streams, or other resources. Mark-up language is used on the Internet in an attempt to provide an open-ended structure by which information of any sort that can be stored electronically (or perhaps even otherwise) can be made available to an end user on demand. As such, the Internet is seen as a powerful tool making almost any information resource available to any computer or to any person using a computer.

Over the past several years, the personal computer has increased in power and capacity as commercial demand has driven the research and development of producers and vendors. It is now not uncommon to be able to easily find an Intel-manufactured 500 megahertz Pentium®-based system having well over 10 gigabytes of hard disk space, as well as 32-256 megabytes of RAM. As such, the power by which files may be received and acted upon by the local user through his or her PC has kept pace with the advances in technology.

However, there currently remain obstacles to universal access to an individual's own information stored on his or her computer. First of all, computers are very heavy. They are bulky. They generally weigh several kilograms and are not easily transportable. Lightweight laptop computers or the like generally do not have the same resources available to the user as a regular PC. Additionally, access to local area networks (LANs) is generally not available once the computer leaves the premises occupied by the LAN. Additionally, Internet access is often restricted by the use of a modem. Modems generally provide data transmission speeds on the order of 56 kilobits per second. This is approximately the same as 7 kilobytes per second. However, headers and other information are required to properly transmit information over the Internet and increase the effective size of files.

Even with the increased availability of broad band access to the Internet, it becomes an important feature of electronic information processing and the like in order to provide resident resources on the Internet. Such resources could include the sharing of files and the like in a manner that are easy to use and understand.

Due to these and other restrictions regarding data transport, transmission, and reception, a need has arisen for means by which files and other data may be available worldwide through the Internet and not tied to a local computer. The present invention addresses this demand by providing means by which files and other data may be stored on the Internet and made available worldwide through the Internet.

SUMMARY OF THE INVENTION

The present invention provides an "Internet hard drive" or "Internet hard disk" to and from which files may be stored and retrieved. Denominated commercially as "X:Drive," the present invention allows users to store files of foreseeably any type on a resource available throughout the Internet. Once available to the Internet, the files stored on the user's X:Drive are available to the same extent as the Internet, namely worldwide.

Note should be made that the term "X:Drive" refers both to the system as a whole and to the individual space allocated to an individual user. Consequently, reference is sometimes made herein to the X:Drive system or to X:Drive to refer to the system as a whole. At other times, the term X:Drive indicates the user's individual X:Drive, or allocated space. The different uses are indicated by context.

In order to effect the Shared Internet Storage Resource of the present invention, a central or distributed storage facility is provided. First and foremost is the high-speed access storage facility where files are actually stored. Such individual storage areas may be allocated in individual limited allotments, or be left open-ended and limited only by the capacity of the physical devices responsible for storage. Metadata, that is data about the files stored on the network hard drives or other storage devices, is generated and stored in a separate database. The database of metadata (the metadatabase) and the network-attached storage facility may be linked by an internal network. It is possible for the database to be stored on the same network storage facility or device on which user files are also stored. System management may select whether or not to distribute or consolidate the database with the network storage.

Also attached to the internal network is a web server that serves to generate and transmit the information to the Internet, and ultimately the user. The web server files may pass through a load balancer and/or firewall before proceeding on to the Internet. The same is similarly true for information coming into the web server from the Internet.

XML may be used in combination with JavaScript or the like to provide two means by which the Shared Internet Storage Resource of the present invention may be achieved. The first is a JavaScript object which may be transmitted to a browser program running on the user's computer. Such browsers may include ones that are well known, including Netscape® Communicator and Microsoft® Internet Explorer. Alternatively, a stand-alone application may be installed and stored upon the user's computer. This stand-alone application serves to intermediate the user commands with the web server and ultimately the metadatabase in the Internet storage device.

As an additional enhancement, the user interface may be a client program that meshes seamlessly with standard user presentations in WYSIWYG (what you see is what you get) graphic user interfaces (GUIs). As such, a drive may be shown on the user's computer and may be denominated "x:" (or "y:" or "z:", etc., depending upon user preferences). The user can then read from or write to the x:\ Shared Internet Storage Resource drive much in the same way as you would the local a:\ and c:\ hard drive.

When the user shuts down his or her computer, information that is stored on the Shared Internet Storage Resource of the present invention remains on the Internet. The user can then access such information from another computer, another geographic location, or even give permission to share files on the Shared Internet Storage Resource with others. Password protection or other security protocols may be used to limit or discriminate access to the user's files.

The Shared Internet Storage Resource of the present invention allows for direct Internet-to-Internet file transfer to a user's allocated X:Drive file space in a process referred to as "Skip the Download" or "Save to My Xdrive."

In one embodiment of the present system, a client-server system for a network-based data storage and manipulation system is provided that may include a client system having a file access service and a file manipulation service, as well as a server that may provide network-based data storage resources and responses to requests transmitted by the client system as the server may effect such requests.

The file access service may include both a request processing layer for processing requests and a first network I/O layer which transmits the requests to the server. The first network I/O layer may transmit a signal to the server to indicate the presence and nature of at least one of the requests to the server and the server may respond to the first I/O layer signal by transmitting one or more additional signals to interested components of the request in order to broadcast the first I/O layer's signal. The server may determine if a client request is one for metadata regarding data stored upon the server.

The file manipulation service may include an XML parser that parses the metadata from the server. The file manipulation service may also include a data structure that receives and preserves parsed data from the XML parser. The file manipulation service may also include a data display layer operating upon and displaying the parsed data such that metadata may be displayed to inform about data stored upon the server.

The server may provide the metadata if the client request is for metadata and may transmit the metadata to the file manipulation service. The server may provide a second network I/O layer which is engaged when the requests are not for metadata. The second network I/O layer may transmit requests for file action and the server may also provide a resource access layer that may receive transmissions from the second network I/O layer and may effect the requests. The resource access layer may engage when the requests are for metadata with the resource access layer obtaining and transmitting the metadata.

The server may provide a metadata compiler in the form of an XML generator with the metadata compiler receiving the metadata from the resource access layer, compiling the metadata, and transmitting the compiled metadata to the client system;

The second network I/O layer may transmit a signal to the server indicating the presence and nature of at least one of the requests to the server and the server may responds to the second I/O layer signal by transmitting one or more additional signals to interested components of the request in order to broadcast the second I/O layer signal. The second network I/O layer may support interpretation of the request transmitted by the client system as the second network I/O layer may enable interpretation of the request to promote a user's actions or effect the user's preferences.

As a result, the server may perform a file action if the client request is not for metadata, and the server may update the metadata and may transmit the metadata to the file manipulation service such that the server operates, and the client system presents, operations on the server in a manner similar to operations local to the client system.

OBJECTS OF THE INVENTION

It is an object of the present invention to provide a Shared Internet Storage Resource on which users may store and retrieve files to make them available to themselves, or possibly others, throughout the Internet.

It is an additional object of the present invention to provide all manner of file access and control generally available to files local to the users for such Internet-stored files.

It is an additional object of the present invention to provide an easy-to-use and readily understood user interface through which files may be stored, retrieved, and manipulated on the Internet.

It is an additional object of the present invention to gather metadata regarding such files and to store such metadata in a database.

It is yet another object of the present invention to provide a plurality of means by which Internet-stored files may be manipulated and controlled.

It is yet another object of the present invention to provide a browser-based access to Internet-stored files.

It is yet another object of the present invention to provide stand-alone application access to Internet-stored files.

It is yet another object of the present invention to provide means by which Internet files may be stored on an Internet resource by a direct Internet-to-Internet transfer subject to the control of a remote or limited-resource user.

These and other objects and advantages of the present invention will be apparent from a review of the following specification and accompanying drawings. The foregoing objects are some of but a few of the goals sought to be attained by the present invention.

BRIEF DESCRIPTION OF THE APPENDICES

Figure 1:
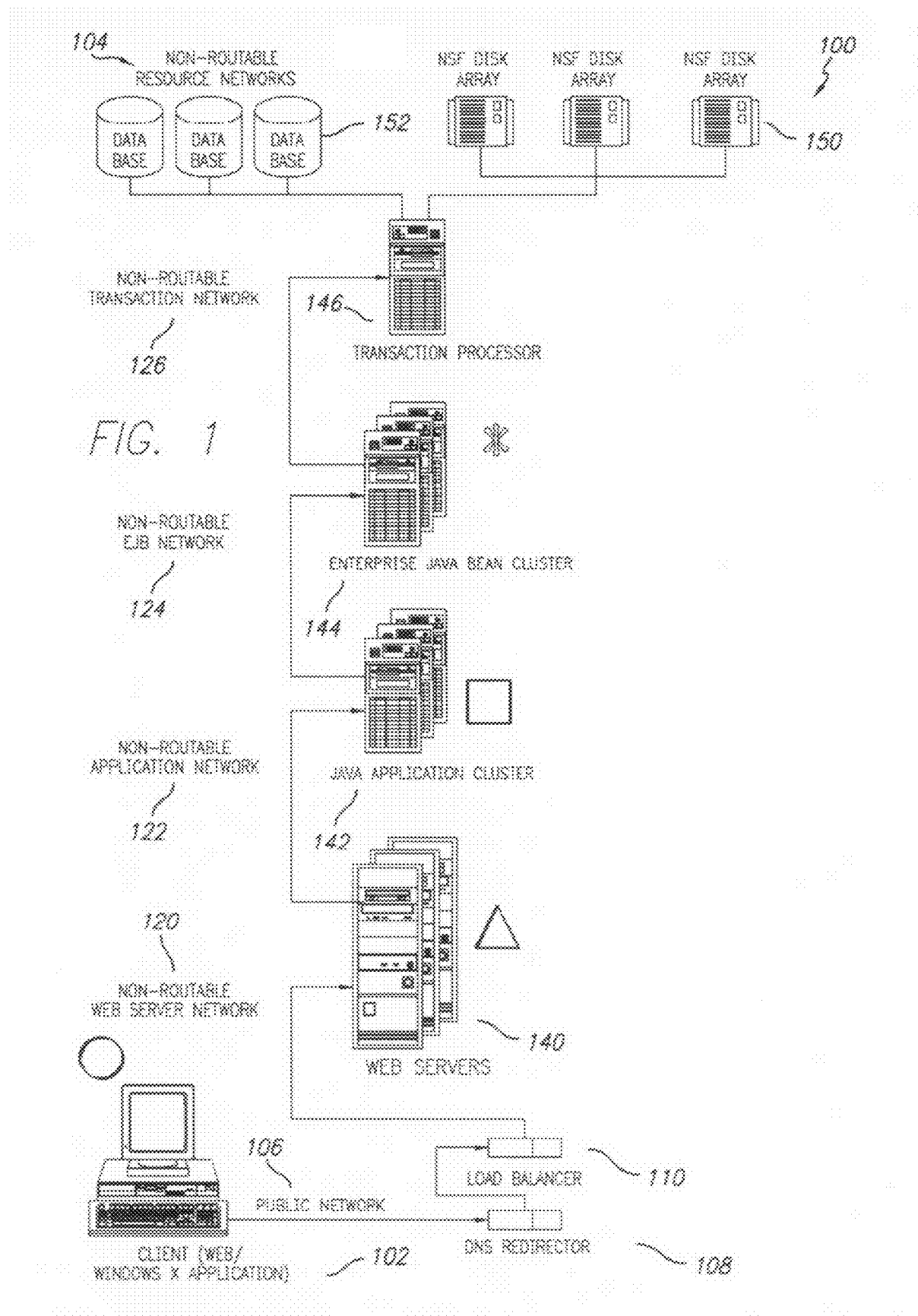
FIG. 1 is a schematic view of the X:Drive system of the present invention. The different tier levels are shown, along with the marking indicia of a circle, triangle, square, and star/asterisk corresponding to the same indicia in FIG. 3.

The following appendices are incorporated herein by this reference thereto.

Appendix 1 is a listing of web site/server code use to achieve the present invention.

Appendix 2 is a listing of the code used on the client side to achieve the present invention in a Microsoft® Windows™ environment.

Appendix 3 is a listing of the JavaScript code used to achieve the present invention in a Sun Microsystems® Java® environment (including one on a browser).

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Appendices 1, 2, and 3 provide the source code for, respectively, the Web Site/Server Code of the X:Drive Shared Internet Storage Resource system of the present invention; the Windows Client Code; and the JavaScript Listings for the present invention. These Appendices are incorporated herein by this reference thereto as if set out in their entirety. It is contemplated that these Appendices provide a full, complete, and enabling disclosure to those of ordinary skill in the art or less by which the present invention may be achieved.

Additionally, the reference numbers used in conjunction with the figures are numbered such that the 100's place of the number indicates the number of the drawing figure. For example, the 600 series of reference numbers refers to FIG. 6, while the 200 series refers to elements shown in FIG. 2.

The present invention provides a method by which an Internet hard disk or hard drive may be achieved in a manner similar to a hard disk or hard drive available locally to the individual on the local computer. Additionally, as Internet use becomes a more familiar and everyday event for people, the resources provided by the present invention may allow the actual use of the Internet hard drive or X:Drive set forth herein to act as such a resource with the files being called up for execution for programs available and processed either locally and/or over the Internet. In light of the foregoing, it can be seen that the present invention may act as a bridge or may pave the way towards a more inter-networked community for the use and processing of electronic information.

The virtual disk drive provided by the present invention may be selectively shared with others or kept entirely private. Additionally, and as set forth in more detail below, the use of a metadatabase provides quicker access and the ability to distribute the information regarding the legion of X:Drive accounts over a wide geographic area, enabling redundant preservation of user information by server clusters implementing Enterprise JavaBeans® (EJBs), or otherwise.

The Shared Internet Storage Resource, User Interface System, and Method set forth herein is generally referred to as "X:Drive." Context reveals whether or not the term X:Drive is referring either to the system as a whole or the individual's own account.

The X:Drive system of the present invention uses network application practices and may rely upon Java® Enterprise JavaBeans™ (EJBs) to enable distributed and clustered computing and file management environment. Along with such Java®-based and network-oriented design, the X:Drive system of the present invention also contemplates the use of open programming standards such as XML and Web-DAV (Web-based Distributed Authoring and Versioning). The use of such technology is foreseen as providing wide support by the user community as well as speed and development, refinement, and polishing.

As shown in FIG. 1, the X:Drive system 100 has a multi-tiered, network-based application infrastructure. The multi-tiered nature of the system allows it to separate operations in an efficient manner. The network-based aspects of the X:Drive system allows it to disperse resources geographically as well as allow a high degree of communication between different aspects or facets of the system.

The X:Drive system may be considered enabling technology as a medium that is independent of the applications and uses to which it is applied. The X:Drive system is currently based on object-oriented principles with each application layer responsible for a discreet functionality or aspect of operation. Both hardware and software resources may then successfully experience heavy re-use with both scalability and flexibility inherently provided. While these advantageous aspects of the X:Drive system are achieved, as a multi-tiered system, X:Drive involves a higher cost of complexity and planning. Thus, those who would seek to wrongly copy the X:Drive system would do so without accruing the great expense in time and money necessary to achieve the present X:Drive system. They would ride on the backs of those who not only developed the system, but also those who got it to work right and in a commercially-reliable manner.

The use of tiers in the X:Drive system of the present invention is realized in both the network systems and the application systems involved in achieving X:Drive.

As shown in FIG. 1, a variety of tiers, or layers, are present between the client 102 and the ultimate data resources 104. Between the client 102 and the data resources 104, are one or more layers or tiers, accomplishing the following.

The client 102 may be coupled to a public network 106 (such as the Internet) that may include a DNS redirector 108 as well as a load balancer 110. The public network 106 may then lead into a web server network 120. The web server may then lead into an application network 122, which in turn leads into an EJB (Enterprise JavaBeans™) network 124. The EJB network 124 may lead into a transaction network 126, which in turn leads into the data resources 104.

The client 102 may be either a web- or browser-based application or an application resident on a Windows™ X system (the X indicating the version of Windows applicable, i.e., Windows® 95, Windows® 98, Windows® 2000, etc.). Requests generally originate from the client as the X:Drive system 100 is one that operates at the command of users directing the client program. Client requests may be made versus the Hypertext Transfer Protocol (HTTP) GET/POST function. In a preferred embodiment, the GET/POST operation may be augmented with Web-DAV extensions to the HTTP protocol. Commands are transmitted by the client 102 are sent to the DNS redirector 108, which then isolate the request via a proxy server process. A proxy server process prevents a direct connection between the client 102 and the other downstream resources in the X:Drive system 100. Such proxy serving prevents inadvertent or mischievous disruption of service by allowing only certain commands or information to be propagated through the X:Drive system 100. This prevents mischievous users from disrupting the system as such rogue commands are intercepted by the proxy server and denied further propagation.

After the client command has passed through the DNS redirector/proxy server 108, the request by the client 102 is then directed to the most appropriate facility. As the X:Drive system is scalable, facilities may be distributed geographically, even over the face of the globe. This allows, at the outset, more efficiencies to take place in the X:Drive system 100 of the present invention so that more users may be served more quickly and so that the advantageous features of the X:Drive system may be realized by the widest number of users in the quickest way possible.

Due to the construction and architecture of the X:Drive system 100, a number of machines/servers running a number of different processes may be distributed over a wide area. Broad band or high-speed access as provided by Internet backbone or the like may allow the X:Drive system to be effectively carried out over the entire face of the planet. The scalability and flexibility of the present invention augments its utility. Such advantages are further advanced by efficient use of the resources so that greater and better service can be provided.

Upon receiving the request from the client 102, the DNS redirector 108 transmits the requests on to a load balancer which may provide a second proxy process under HTTP protocol and transmit the request to the least-loaded and most-available web server on an internal, non-routable, or other server network 120.

The web server network 120 may be non-routable and may comprise a number of individual machines or servers processing the HTTP or other requests from one or more load balancers 110. Each of the web servers 140 in the network 120 may handle HTTP requests for static content, such as HTML and graphic files. The web servers may proxy all requests for dynamic content to a Java® application network 122.

As used in the X:Drive system 100 of the present invention, the Java® application networks may be non-routable. The use of non-routable facilities in the X:Drive system 100 of the present invention indicates their operation in a local area network (LAN). However, between tiers, the individual networks themselves may be available such that a web server 140 in Illinois may pass requests for dynamic content to Java® application clusters 122 in Wisconsin.

Each Java® application cluster 122 may be composed of a number of Java® application servers 142 with each server 142 handling display functions necessary for user accounts, including the generation of XML, HTML, and other instructing displays for either browser or application clients 102. If a Java® application cluster 122 receives a resource request from the web server tier 120, the Java® application cluster 122 will pass the resource request onto the Enterprise Java-Bean™ EJB network tier 124.

As for the web server 120 and Java® application networks 122, the EJB network 124 may also be non-routable and operate upon a LAN. The EJB network may be an EJB cluster having a number of EJB servers 144. Each EJB cluster handles the business logic and resource access methods and protocols required for the resource requests and management. The EJB cluster (EJBC) caches memory of common resources such as the pooling of data connections and the like, as well as data objects. Resource access requests and transmissions are then passed out to the transaction network tier 126, which may also be non-routable. The transaction network tier 126 has a transaction processor 146 which controls, operates, and guarantees access and transactions on different resources. These different resources are the ultimate data resources 104 that may include NFS (Network File Server) disk arrays 150 and databases 152. The NFS disk arrays 150 may supply the actual storage capacity for the files of generally any size. The databases 152 comprise records of information regarding each of the files (metadata) stored by the NFS disk arrays 150 under the X:Drive system 100.

By bifurcating the file information in databases 152 separate from the actual files themselves on the NFS disk arrays 150, file information and user queries can be handled much more quickly as display components of the present invention are important to provide the user information regarding the status and availability of the files stored on the X:Drive system 100. Consequently, although a user may have a hundred separate files in an X:Drive directory, he or she may be only interested in one. Consequently in order to provide the user the information necessary to make the decision as to which file to receive, move, rename, delete, or store, the use of the database provides a very quick and easy means by which such user requests can be satisfied. It is anticipated that the actual use of the file storage facilities on the NFS disk arrays 150 or the like may comprise only a part of the operations of the present invention. Having the ability to display, select, and determine file operations is one of the useful advantages provided by the X:Drive system 100 of the present invention.

Note should be taken of the non-numerical indicia present in FIG. 1. Most notably, a circle is associated with the client 102, a triangle with the Java® application cluster 122, a square with the EJB network 124, and a star/asterisk with the transaction network. These non-numerical indicia correspond to those set forth in FIG. 3. As different actions are performed at different tiers in the present invention, the non-numerical indicia provide an easy or visual means by which the operation of the different tiers can be indicated in FIG. 3.

Figure 2:
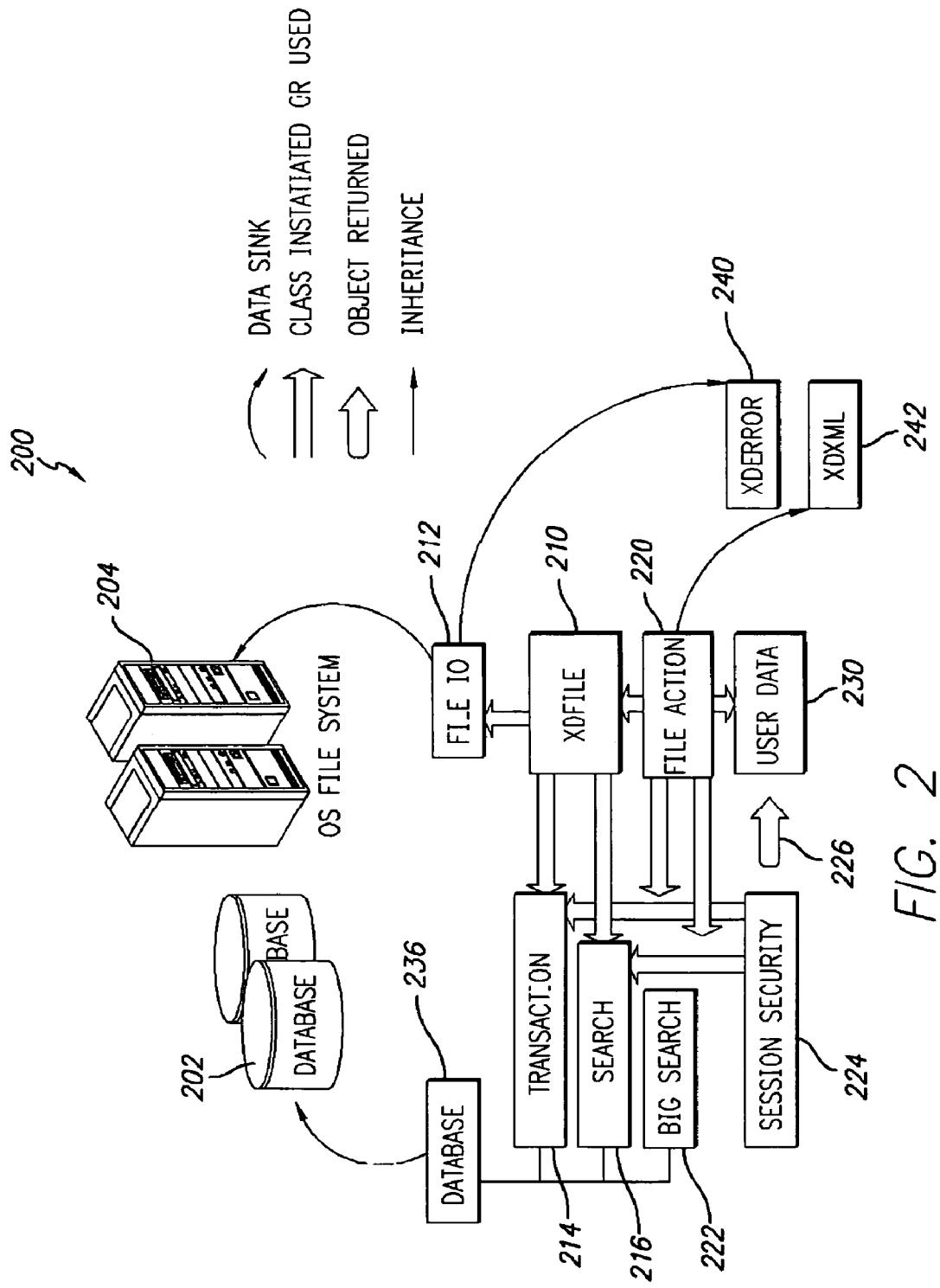
FIG. 2 is a schematic view of Java® library objects operating in the transactions or data exchanges occurring in the present invention.

FIG. 2 shows a logic diagram in sequence structure for the Java® library objects used in the X:Drive system 100 of the present invention. Generally, throughout the description of the X:Drive system 100 of the present invention, the prefix XD indicates "X:Drive." For example, in FIG. 2 the steps/status indicators of XDError stands for X:Drive Error, and XDXML stands for X:Drive Extensible Markup Language.

Likewise, the use of the term XDFile indicates X:Drive File as a Java® library object effecting and intermediating the file operations of the present invention.

In FIG. 2, the Java® system 200 allows operations to be performed on the metadatabase 202 and the operating system (OS) File System 204. Additionally, the XDFile object 210 may activate or instantiate the Database.Search object 216. The XDFile object 210 may be activated, or invoked, by the FileAction object 220. The FileAction object 220 may also activate the Database.Search 216 and Database.BigSearch 222 objects. Operations of the Java® library objects in the system 200 as shown in FIG. 2 may be contingent upon the SessionSecurity object 224, which may instantiate or use the Database.Search object 216 and/or the Database.Transaction object 214. The SessionSecurity object 224 may return a separate object 226 to the UserData object 230. The Database object 236 may inherit or transmit from its Transaction 214, Search 216, and/or BigSearch 222 objects.

The information generated may then be transmitted to the Database 202 for meta-information and the OS File System 204 for the actual data. If an error is generated during the operation of the Java® library object system 200, an XDError object 240 may serve to handle the error while a successful operation may be returned in the form of the XDXML object 242. In the Java® library object system 200 of FIG. 2, the Database 202 may contain intelligence or programming for connection to SQL databases and the like. Options regarding the operations of the database 202 may be read from a configuration file. The Database object 236 may be able to connect multiple databases for redundancy in the case of repeated or redundantly archived information, or for functionality in order to connect to that database which responds most quickly to the requests and commands.

The Database object 236 determines which database operation to perform and/or to which database to send operations based on the type of request it receives. For example, transaction requests may demand a separate database from those of regular query and BigSearch 222 requests. In order to maintain more efficient operation, the Database object 236 generally sends session users to the same database whenever possible so that latency and database replication is not passed on to the user.

The Database.Transaction object 214 is able to handle larger SQL statements such as those that would cause a load on the database. The Database.Transaction object 214 may spawn children classes that handle the transaction logic in order for more efficient operation.

The Database.Search object 216 is designed to handle smaller SQL statements and has children classes for specific search types, such as those along anticipated and common fields or types of information.

The Database.BigSearch object 222 handles larger, non-transactional SQL statements such as those used for reports in system accounting, monitoring, or otherwise. Children classes of the Database.BigSearch object 222 would handle specific large searches such as those that might be implemented on a monthly or other periodic basis.

The FileIO object 212 inherits and overrides Java®'s data file object. The file object contains logic to engage multiple disks or resources for redundancy and/or functionality and contains the functionalities necessary to manipulate files on the OS File System 204. The FileIO object 212 may react to the JMS (Java Messaging Service) events triggered by events on the disks of the OS File System 204.

Figure 5:
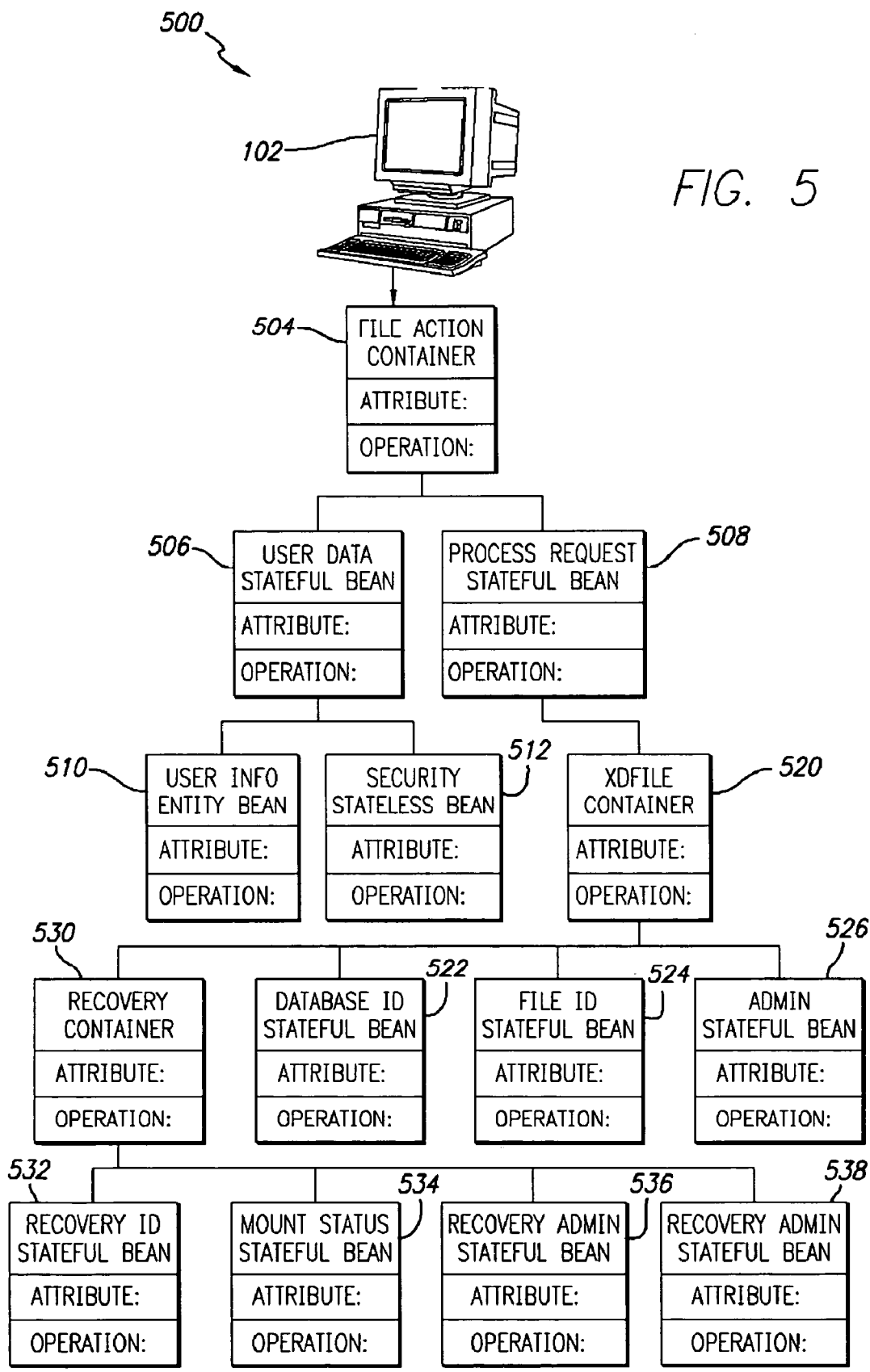
FIG. 5 is an overview of the Java® architecture used to effect transactions in the present invention.
Figure 9:
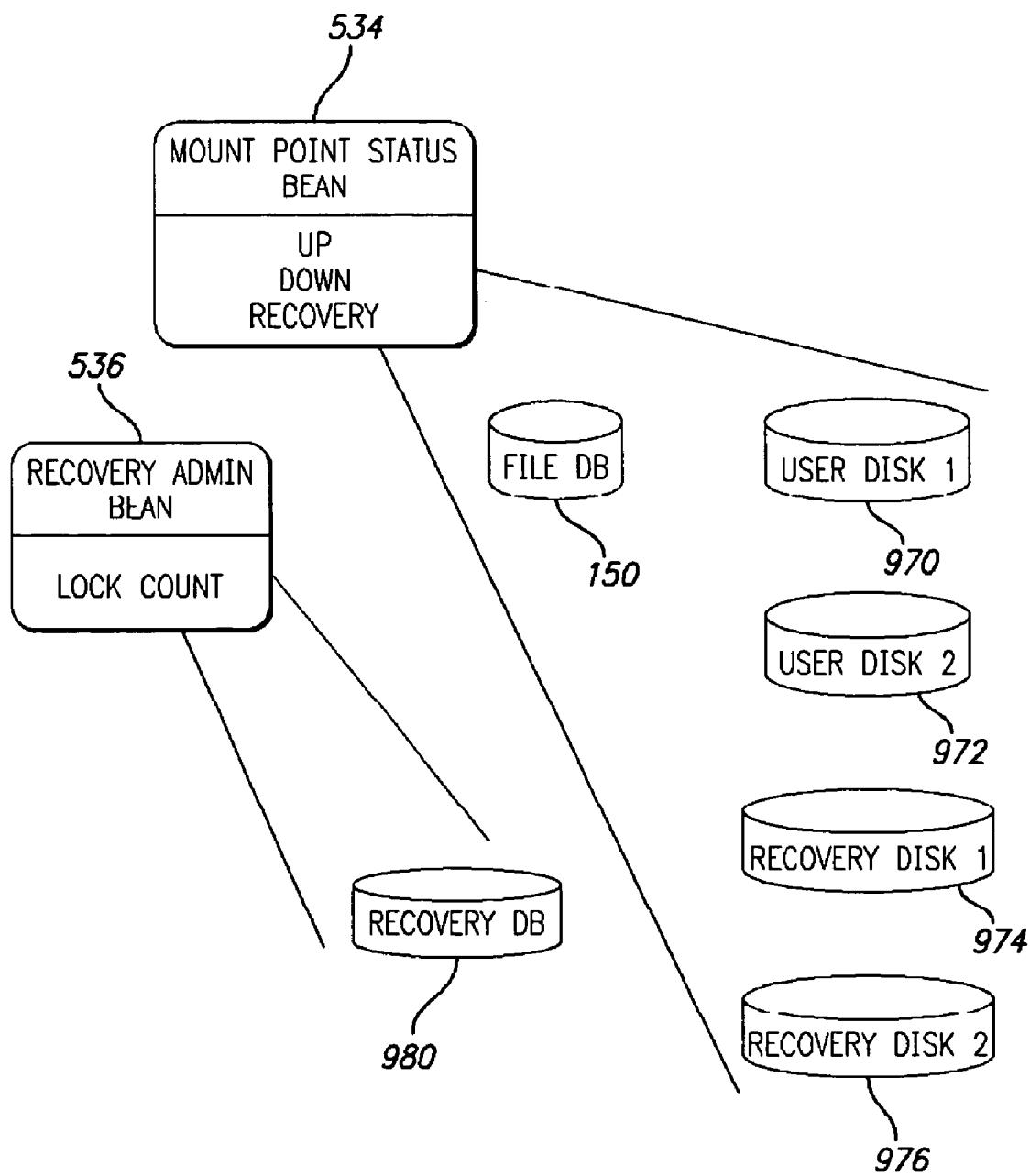
FIG. 9 is a schematic depiction of failure recovery elements.

Alternatively, one or more monitoring objects may be used to gather pertinent status information regarding the OS File System 204. When monitoring objects are used, the FileIO objects then query the common monitoring objects to determine the state of the system. In the present system, the monitoring object is denominated the Mount Point Status bean, or MPS bean, 534 (FIGS. 5 and 9).

Additionally, disk level transactions are carried out by the FileIO object 212. Under the management of the FileIO object 212, user accounts are able to span or traverse several disks. The spanning of such several disks enables better recovery from failure should an error occur or system resources become unavailable in an unpredictable manner. The XDFile object 210 uses FileIO 212 to handle the file system transactions. By using the Database.Transaction file object, the XDFile object 210 handles database file transactions. The XDFile object 210 coordinates transactions for both the FileIO object 212 and the Database.Transaction file object 214 to keep both synchronized and to handle failure should it occur.

The UserData object 230 holds user data for a session of the X:Drive system. A session is basically a span of time for which a user engages the X:Drive system. Methods are included in the UserData object 230 to manipulate the user status, so that the activity may be monitored, as well as whether or not the user has logged in.

The SessionSecurity object 224 uses web logic session mechanisms to create the UserData object 230. It does this by returning a separate object 226. The SessionSecurity object 224 authenticates a user's login and expires old sessions with re-direction of such old sessions to appropriate pages.

The FileAction object 220 may have children classes and contain logic for determining request types such as user requests, administration requests, etc. Tests for file action requests such as quotas and permissions, etc., may also be handled by the FileAction object 220. The FileAction object 220 accesses the file methods in the XDFile object 210.

The XDError object 240 reads a configuration file of error lists which gives each error an I.D. number. Such error lists preferably pivot on the language in which the X:Drive system 100 of the present invention is programmed. Such lists should also be able to pivot on the partner with which the X:Drive system 100 operates. Default values for the lists may be to X:Drive errors in the English language. The XDError object 240 preferably holds errors in a stack and returns any such errors from the stack. Additionally, the XDError object 240 preferably accepts new errors by code or by message.

The XDXML object 242 accepts an object and delivers as output an XML representation of a transaction or status requested by the user or client software.

Figures 1, 3:
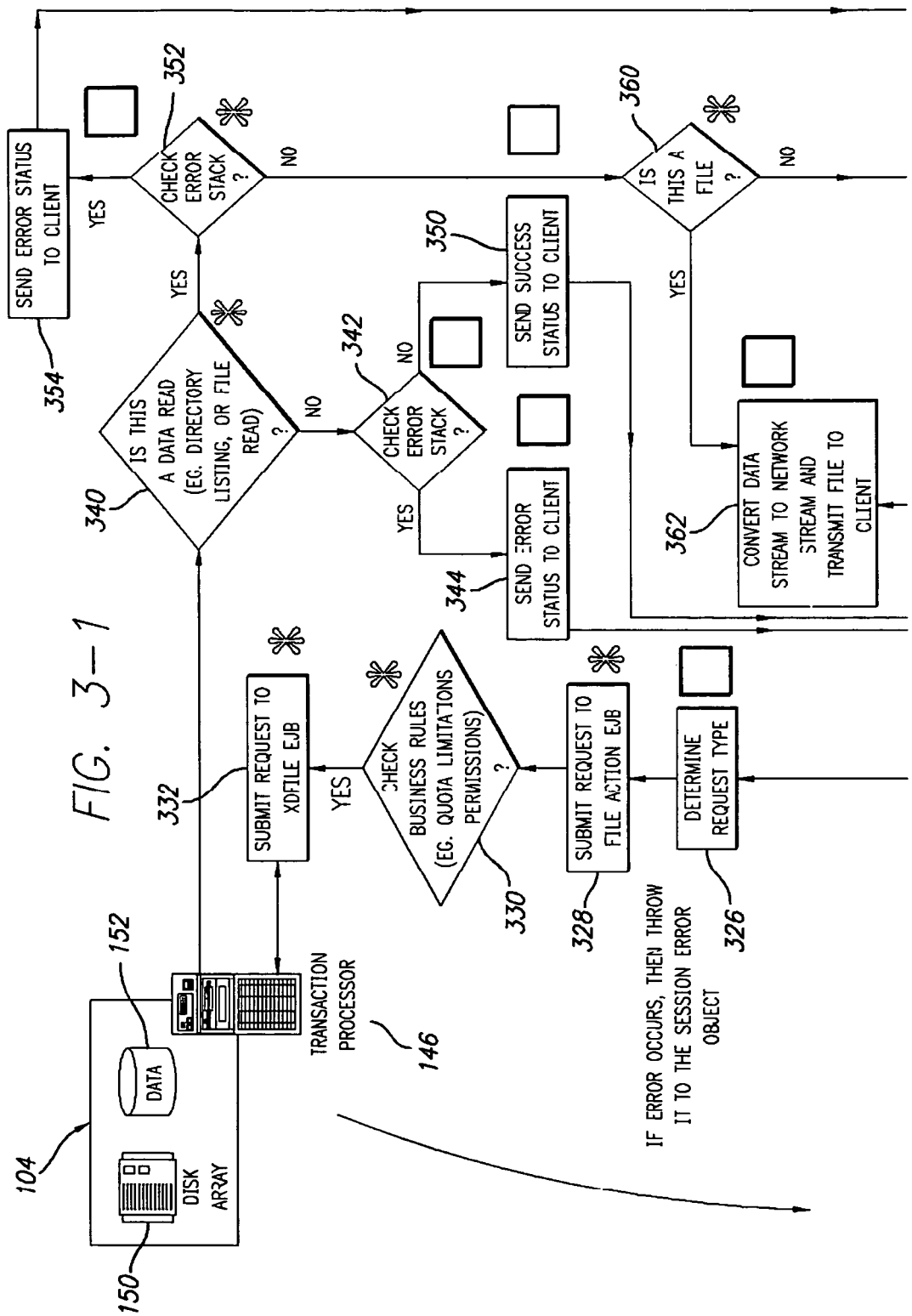
FIG. 3 is a detailed flow diagram showing the operation of the present invention. Indicia including a circle, a triangle, a square, and a star/asterisk correspond to tier levels shown in FIG. 1 and indicate the level of operation of the steps shown in the flowchart of FIG. 3.
Figures 2, 3:
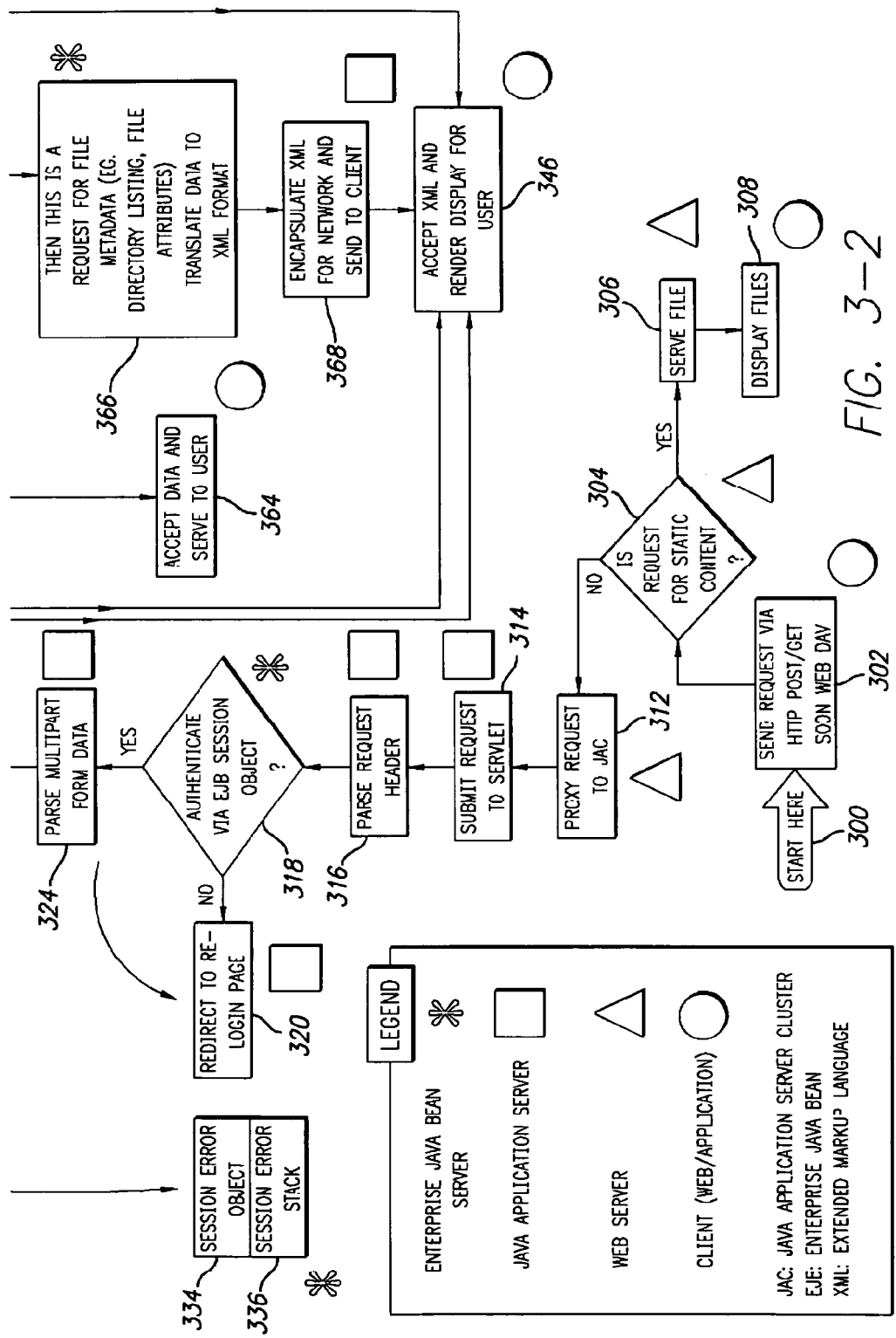

FIG. 3 shows the data flow through the X:Drive system 100 of the present invention, particularly that as reflected by the tiered configuration shown in FIG. 1. From a starting point 300, a request is sent by HTTP POST/GET command at step 302. Web-DAV protocol may also be used and is currently considered preferable. The send request is implemented on the client 102 and is evaluated by the web server 120 as a request for static content in step 304. If the request is for static content, the file is served by the web server 120 at step 306, and the file is displayed at step 308 by the client 102.

If at step 304 the request for static content is evaluated as negative, a proxy request is issued by the web server network 120 to the Java® application cluster 122 at step 312. The request is received by the Java® application cluster (JAC) 122 and submitted to a servlet at step 314. The Java® application cluster (JAC) 122 then parses the request header at step 316. The Enterprise JavaBean™ (EJB) network 124 then authenticates the request at step 318. If authentication cannot be achieved, process control is then re-directed to the re-login page via the JAC network 122 at step 320. If authentication succeeds at step 318, the JAC network 122 then parses the multi-part form data at step 324.

The JAC network 122 then determines the type of request at step 326. The request is then submitted to the FileAction EJB 220 at step 328. The EJB network 124 then evaluates the request at step 330 in order to ensure that all the business rules and other applicable limitations are met, such as quota limitations, permissions, and the like. If the evaluation is successful at step 330, the EJB network 124 then submits the request to the XDFile EJB 210 at step 332 and on to the transaction processor 146. The appropriate actions are then taken via the transactional database 152 and the disk arrays 150. If the business rule evaluation 330 fails, an error may be generated and, as for other errors in the data flow process of FIG. 3, a session error object 334 may be generated in a session error stack 336.

In effecting the data transfer to the ultimate system resources 104, evaluation is made as to the operation in step 340. If the operation is not a data read operation such as a directory listing or file read, the error stack is checked at step 342. If an error has occurred, the error status is sent to the client 102 at step 344. The client 102 then accepts the transmitted XML code and renders the appropriate display for the user at step 346. If the error stack evaluation step 342 does not reveal any error, a success message is generated at step 350, and the subsequently-generated XML is received by the client 102 and displayed by the user at step 346.

If at the evaluation step 340, the operation is not a data read action, the error stack is checked at step 352 much in the same way as it was at step 342. If an error has occurred, the error status is sent to the client 102 at step 354. The error status message is then received as XML code by the client 102 at step 346 and displayed to the user. If at evaluation step 352 the error stack reveals no errors, the evaluation is then made by the EJB cluster as to whether or not the operation is a file read at step 360. If the operation is a file read, the data stream is converted to a network stream and transmitted as a file to the client 102 by the Java® application network 122 at step 362. The data is then accepted by the client 102 and served to the user at step 364.

If at evaluation step 360 the operation is not a file read (see FIG. 4), then by elimination, the action is a request for file metadata such as a directory listing indication of file attributes or the like. At step 366, the metadata retrieved from the database 152 is then translated into XML format by the EJB cluster 124. The XML data is then transmitted to the JAC network 122, which encapsulates the XML from the network and sends it on to the client at step 368. The JAC network 122 then sends the encapsulated XML to the client 102 for rendering and display at step 346.

As indicated in the description above with regards to FIG. 3, users utilizing the client system 102 to connect to the X:Drive system 100 do so via the public Internet and then submit requests and receive replies effecting or indicating the user's requests. Requests for file manipulations, such as uploads, downloads, copies, moves and updates travel through each functional layer of the X:Drive system 100.

The core of the EJB cluster, and as indicated in FIG. 2, the XDFile EJB provides core effectiveness in the present X:Drive system 100. The XDFile EJB 210 is a multi-tiered component. The X:Drive system 100 stores file metadata (such as directory structure, file name, file attributes, etc.) in the database 152 for fast retrieval, sorting, searching, linking, and other capabilities beyond standard file systems. The actual file data is stored by the X:Drive system 100 in network-attached storage units or storage area networks such as those shown in FIG. 1, the NFS disk arrays 150.

Figure 4:
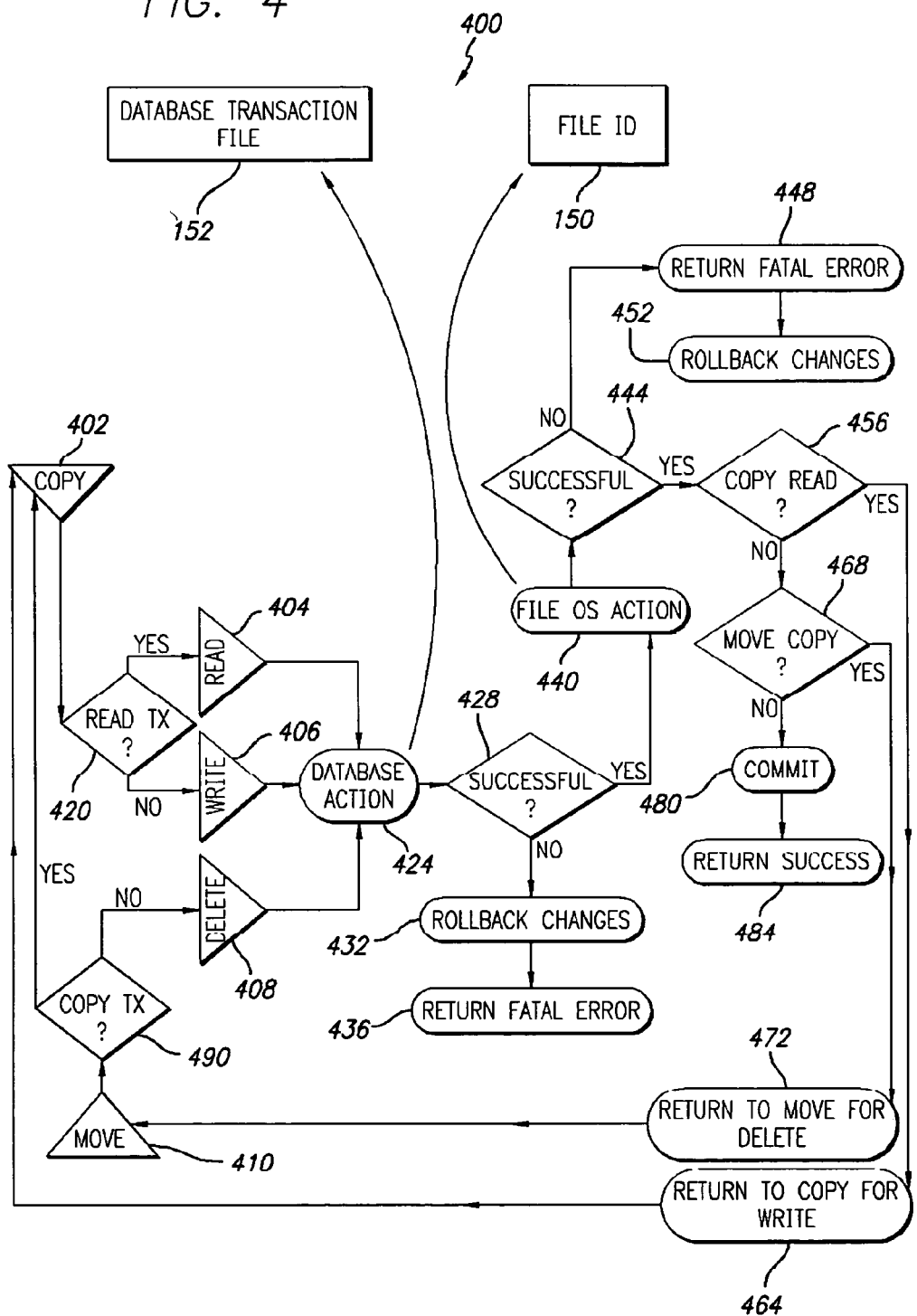
FIG. 4 is a flowchart showing the operation of the XDFile Enterprise JavaBean™ (EJB) used in the present invention.

To access files that exist in this hybrid environment (bifurcated between file information and file data), X:Drive uses the XDFile object 210 to manipulate both files and file data in two-phase committal transactions. FIG. 4 shows the details of these transactions.

In FIG. 4, the XDFile EJB system 400 allows entry at any one of the five darkened triangles. If the action is to be a copy, entry is made at the copy entry point 402. If the action is a file read, entry is made at the file read point 404. If the action is a file write, entry is made at the file write point 406. If the action is a file delete, entry is made at the delete point 408. If the action is a file move, entry into the XDFile EJB 210 is at the move entry point 410.

Beginning first with a file copy action beginning at the copy point 402, the evaluation of the operation occurs at step 420, where determination is made whether or not the action is a read transaction. If the action is a read transaction, program flow proceeds onto the read action and entry point 404. The corresponding database action 424 is then taken. As the action is a read transaction, the corresponding database record is read and evaluation is made as to whether or not the database action, in this case read action, has been successful at step 428. If the read action is not successful, the changes are then rolled back, if any, at step 432. An error is then returned at step 436 and the XDFile object awaits further instructions. If the evaluation at step 428 regarding the database action was successful, action can then be taken on the actual file itself on the OS File System 204 at step 440. In the present case, the FileOS Action 440 is a read action, and the file may be read into a temporary buffer or other memory space. The FileOS Action is evaluated for success at step 444. If the FileOS Action step 440 was unsuccessful, a fatal error is returned at step 448, and the changes, if any, are rolled back at step 452. If the evaluation at step 444 was successful, evaluation is made as to whether or not the action was a copy read at step 456. If the action was a copy read, return is made to the copy entry point 402 at step 464 in order to perform the write portion of the copy function. If the evaluation at step 456 indicates that the action was not a copy read action, evaluation is made at step 468 to determine if the action was a move/copy action. If the action was a move/copy action, control is then directed towards the move entry point 410 via step 472 in order to delete the original file as the success of the move/copy transaction at evaluation step 444 indicates the success of the file write step of the FileOS Action step 440. Program control is then turned over to the move/action entry point 410 so that the original file may be deleted at its original location via the delete entry point 408.

If the move/copy evaluation step 468 indicates that not only was the action not a copy read, it was also not a move/copy, then the action is committed to the system at the ultimate system resource level 104 at step 480 and an indication of success is then returned at step 484.

Upon reaching the move entry point at 410, evaluation is made at step 490 to determine whether or not the transaction is a copy transaction. If it is a copy transaction, the program then enters and executes the copy entry point 402. If not, the delete entry point 408 is activated to effect the remainder of the move transaction.

Consequently, it can be seen that a variety of actions take place depending upon the state of the XDFile EJB 210 at the database action 424 and FileOS action 440 steps.

In performing file reads and writes, simple one-step actions are taken because neither of these read or write actions are either copy reads 456 or move/copy 468 and so they fall into the system commit 480 and return a successful indication at step 484. The same is generally true for the one-step delete action. Consequently, whenever a user wants to read, write or delete a file, entry can be made into the respective entry points at 404, 406, and 408. Errors are returned when necessary.

However, the copy action 402 and the move action 410 require multiple loops through the XDFile EJB 210 in order to effect their operations. For the copy function 402, the initial read must be made successfully with the evaluation step 456 then prompting the write step to occur by the return to the copy entry point at step 464. The read transaction step 420 is then evaluated in the negative and the write entry point/action 406 is invoked with the database action occurring at step 424 to write the new information to the transactional database 152 and, if successful, the FileOS write action for the data at step 440. If the file write is successful, the evaluation at step 456 as to whether or not the action is a copy read is answered in the negative as is the evaluation of the transaction as to whether or not is a copy transaction executed under the move action at step 468. The resources are then committed, temporary resources are released, and the success indication is returned at step 484.

Consequently, for a copy transaction 402, the loop is first made through the read function 404 and then the write function 406. For the move action at entry point 410, a copy transaction is first executed with the two-loop operation as set forth previously. Upon completion of the copy action, the delete action 408 is implemented in order to erase the original file and its file data. Upon the third loop through the delete step 408, the transaction is neither a read under the copy command at step 456 nor a copy under the move command at step 468. Consequently, the move function has successfully completed, the system resources are committed at step 480, and a success indicator is returned at step 484.

In FIG. 5, an overview of the Java® architecture of the X:Drive system 100 of the present invention is shown. The Java® architecture 500 shown in FIG. 5 may generally arise from the client 102. A file action container 504 has certain attributes and operations as do the other beans of the architecture 500. Contained within the file action container 504 are a number of stateful, stateless, and entity beans, as well as other containers having other beans. The file action container 504 contains two stateful beans: a user date stateful bean 506 and a process request stateful bean 508. The user data stateful bean 506 has a user info entity bean 510 and a security stateless bean 512.

The process request stateful bean 508 contains a single container, the XDFile container 520. The XDFile container 520 contains three (3) beans and a container. The three beans of the XDFile container 520 are: a database IO stateful bean 522, a file IO stateful bean 524, and an admin stateful bean 526. The container is a recovery container 530 which contains a recovery IO stateful bean 532, a mount status stateful bean 534, a recovery admin stateful bean 536, and a recovery process stateful bean 538.

Figure 6:
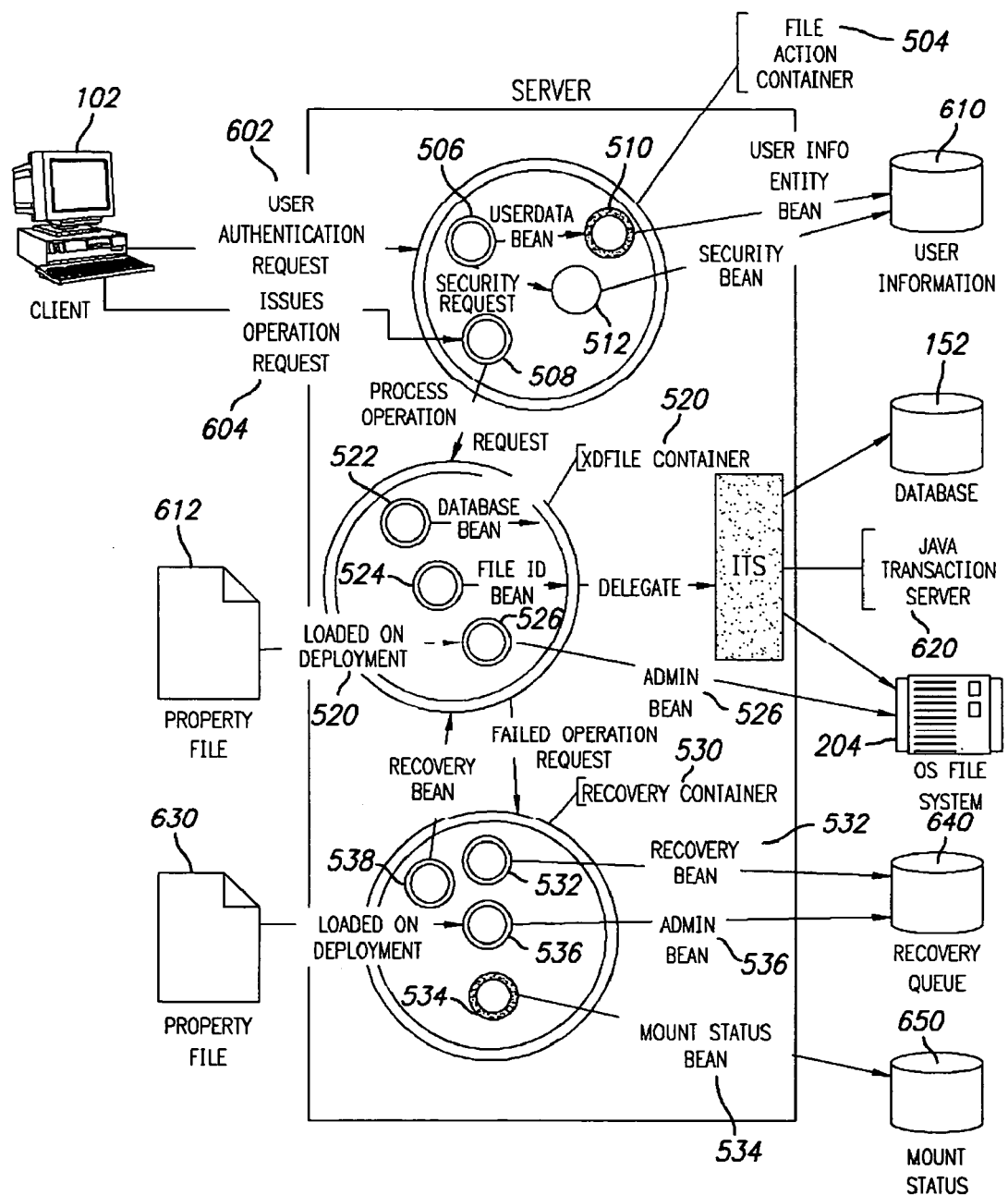
FIG. 6 is an alternative schematic diagram of the Java® architecture shown in FIG. 5.

As indicated by the nature of the beans carried by the containers, stateful beans generally carry information about the state of the bean, process, or otherwise as useful information for the ends and operations of the X:Drive system 100 of the present invention. Stateless beans generally carry no state information, and entity beans are generally for information or identification only. As Java® beans are objects intended to carry both data and processes in association with one another, it is up to the operations of the X:Drive system 100 of the present invention to selectively and appropriately activate the beans and enable the proper actions to take place. The file action container 504 is shown in alternative representation in FIG. 6. In FIG. 6, a client 102 issues a user authentication request 602 and an operation request 604. The user authentication request 602 is passed into the user data stateful bean 506 in the file action container 504. The operation request 604 is passed into the process request stateful bean 508. The user information entity bean 510 then transmits information to a user information database 610, as does the security stateless bean 512. The process request stateful bean uses a first property file 612 that is loaded upon deployment of the XDFile container 520. The property file is loaded into the admin stateful bean 526 for use with the OS file system 204. A Java® transaction server 620 may operate in conjunction with the database 152 as well as the OS file system 204 in order to process the operation request 604. The second property file 630 may be loaded by the recovery admin stateful bean 536 upon the bean's deployment. The recovery IO stateful bean 532 and the recovery admin stateful bean 536 both transmit information to the recovery queue storage buffer 640. The mount status bean 534 operates in conjunction with the mount status of the system 650.

The recovery container 530 is called when once a failed resource begins to recover. Further description of the recovery process is given below. However, FIGS. 5 and 6 operate in tandem to show linearly (FIG. 5) and organically (FIG. 6) the structure and operation of the XDFile object 210.

Figure 7:
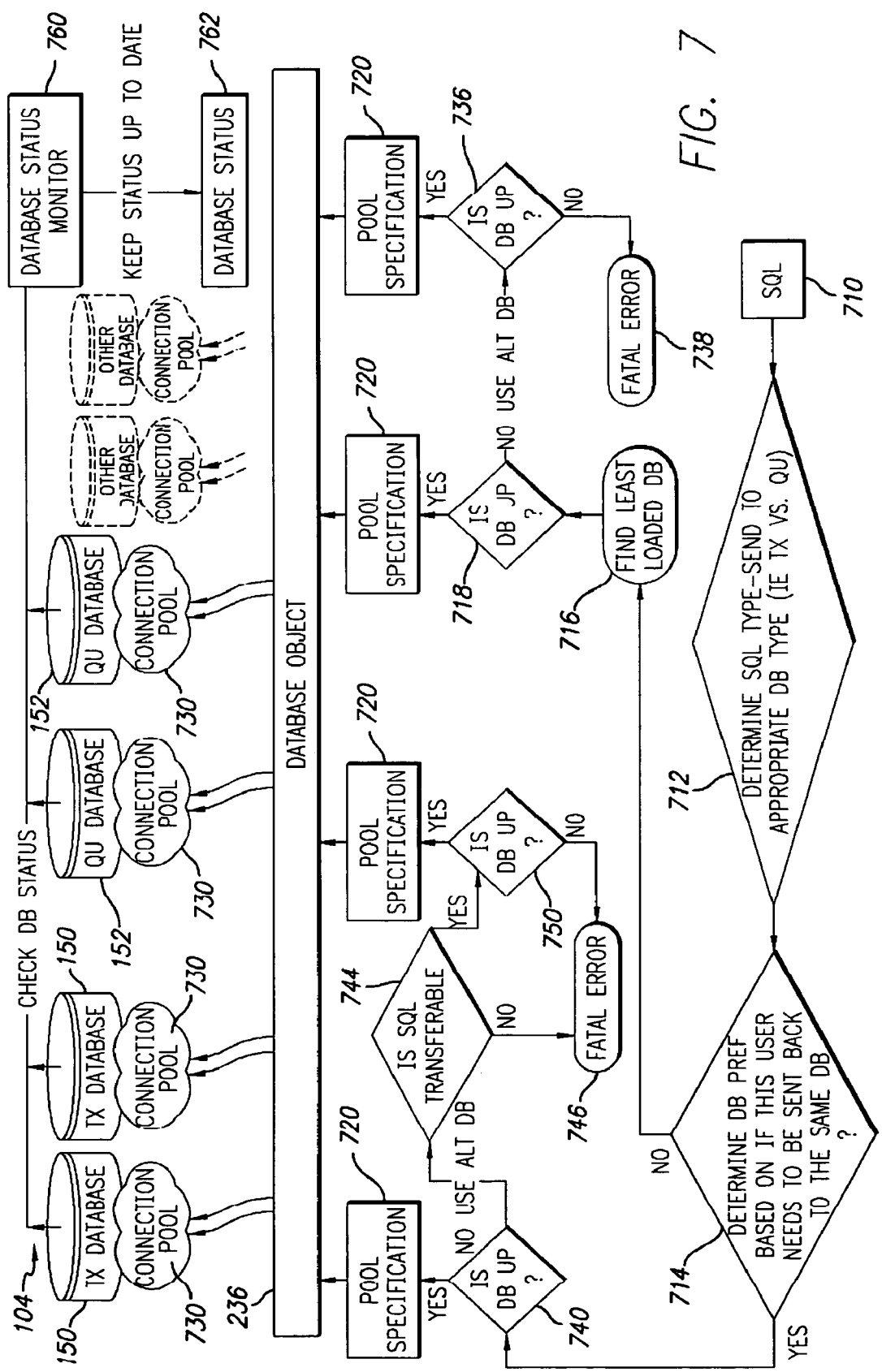
FIG. 7 is a schematic and flowchart diagram showing the IO (input/output) for the database transactions of the present invention.

FIG. 7 shows the detail of the XDFile database component. A transaction processor (such as Tuxedo from BEA) works in conjunction with the database transaction object 214 as well as the FileIO object 212 to provide a robust and reliable system. Both the database transaction 214 and the FileIO 212 objects include logic and/or programming to handle situations where database or disk array access cannot be guaranteed. The database.transaction object 214 handles the inherent doubt present in the system by using replicated or repeated clusters of databases. The replication process creates latency or delay, in the system. In order to accommodate this latency, the database transaction object 214 uses a session object (a data construct representing a user session on the X:Drive system 100) to determine if the user's request can be transferred, or replicated, from one database cluster to another, in case of future system failure.

An important aspect with respect to the reliable operation of the X:Drive system 100 is the need to separate databases into functional groups. While the query database may be optimized for quick and small queries and while a transaction database might be optimized for fewer, larger, more time consuming updates, the database layer 236 in the X:Drive system 100 allows for associating SQL commands with different database clusters based on functionality. Additionally, the X:Drive database layer 236 is configured for consolidation and addition of databases on the fly.

As shown in FIG. 7, the SQL command 710 is issued and passed to a SQL command evaluator 712. A SQL evaluator determines the SQL type so that the SQL can be sent to the appropriate database type (that is, in the X:Drive system 100, the transaction database 150, the query database 152, or both).

Upon determining the database type of the SQL statement 712, the database preference is evaluated at step 714 to determine if the user should be sent back to the same database. If the user is not to be sent back to the same database, the database currently bearing the least load is found in step 716, and query is then made in step 718 to ensure that the selected least-loaded database is still up, running, and available. If it is, a specification regarding the pooling of database resources is created 720 and transmitted to the database object 236. Database object 236 then takes the SQL command and passes it to the appropriate database, either the transaction database 150 or the query database 152 via associated connecting pools 730.

If at step 718 the least loaded database is not available, an alternative database must be used and query is made at step 736 to determine whether or not the alternate database is up. If the alternate database is not up and the evaluation step 736 fails, additional databases may be queried or, as indicated in FIG. 7, a fatal error may be generated at step 738. If the alternate database is up, a pool specification 720 is generated and passed to the database object so that the SQL command may be implemented upon the transactional 152 databases via the connection pools 730.

If at step 714 the user must be sent back to the same database, query is made at step 740 to determine if that database is still up. If it is, the request is passed to the pool specification 720 where it is subsequently passed to the database object 236, on to the connection pool 730, and the appropriate database, either the transaction database 150 or the query database 152. If the same database is not up and the evaluation at step 740 fails, an alternative database must be used, but the SQL request is queried at step 744 to determine if the SQL command is transferable to the alternate database. If not, a fatal error occurs at step 746. If the SQL command is transferable, query is made at step 750 to see if the alternate database is up and active. Should the evaluation fail, subsequent databases may also be queried if the SQL command is transferable. However, as shown in FIG. 7, if the second database is unavailable, a fatal error may be generated at 746. Otherwise, the database is up, and the evaluation at step at 750 is successful and the command is made available to the database object 236 via the pool specification standard 720 and on to the databases through the connection pools 730.

In order to ensure proper operation of the XDFile database object 210, a database status monitor 760 persistently and on-goingly queries the databases 150, 152. The status is then returned to a database status object 762 the database status object may provide information to the recovery container 530 of the XDFile object 210.

Figure 8:
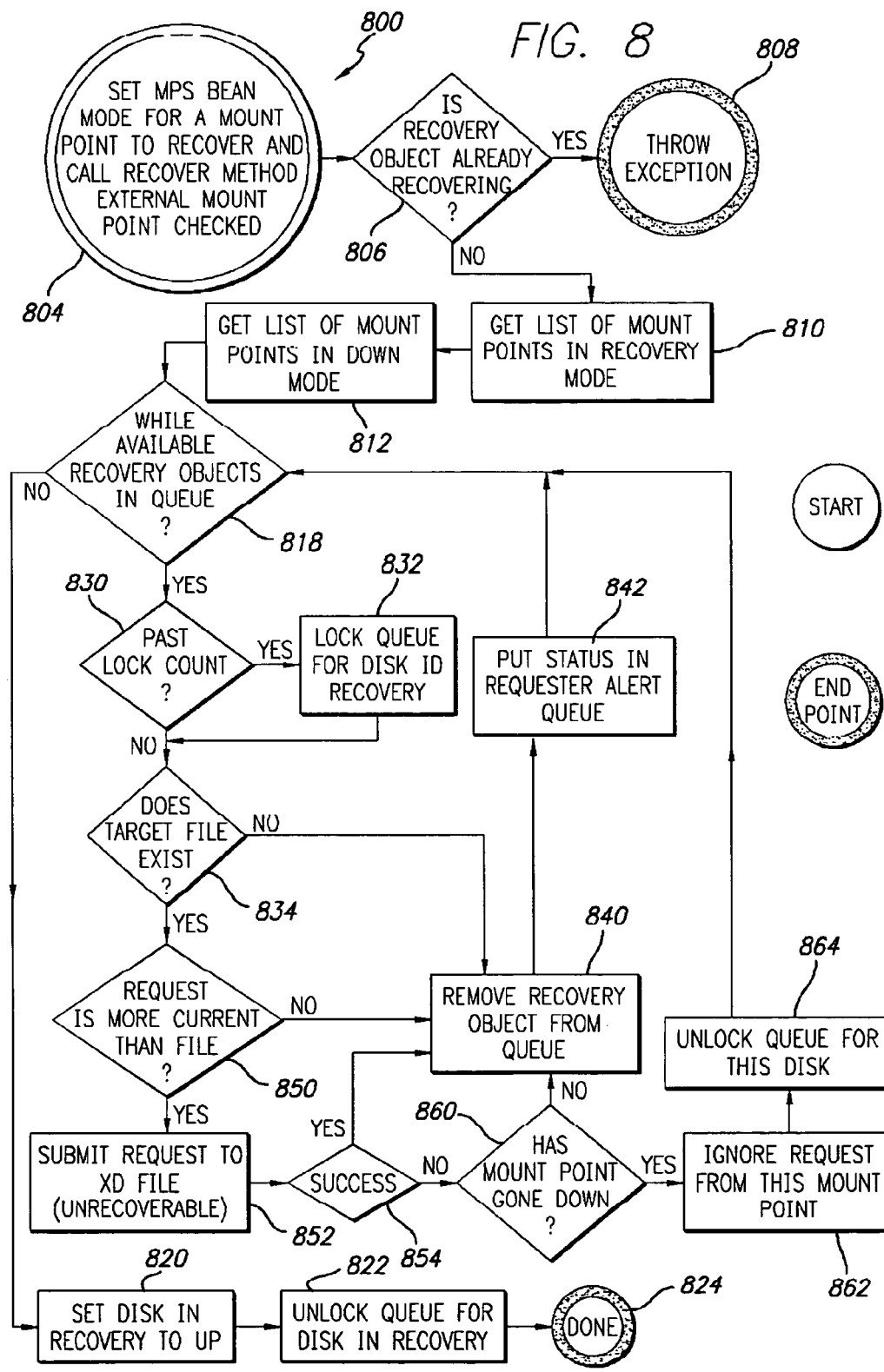
FIG. 8 is a schematic diagram of the data recovery process as effected by the FileIO component of the XDFile object used in the present invention.

The recovery mechanism for the X:Drive system 100 of the present invention is shown in FIG. 8. The FileIO object 212 uses a recovery object such as the recovery container 530 to handle write transactions 406 (as opposed to read transactions 404) when the transaction processor 214 fails. The recovery object is transparent to the user, making it easier and more convenient for the user to use the X:Drive system 100 while decreasing the concern that such a user would have in case of a power outage or other failure in one part of the X:Drive system 100.

The FileIO object 212 reports an error to the user, but informs the user that her request was stored in the X:Drive system 100 and that the X:Drive system 100 will try to apply the change as soon as possible. If the storage unit, represented as a mounting point in the EJB cluster becomes unavailable for write transactions 406, the monitoring client 760 updates the EJB network 124 that the status of the mounting point is "down." Once the mounting point is available and checked for data integrity, the status is updated from "down" to "recovery" and the recovery object 530 is called to apply all queued requests for the file action container 504. This keeps the user from catastrophically losing uploads and other file writes, but may cause some delay in file reads.

In the recovery system 800 of the present invention, the multi-connected pooled database object, the recovery-enabled FileIO object 212, and the transaction processor 146 work together to create a resource layer offering high availability, recovery, and scalability. Additionally, this resource layer (encapsulated in the XDFile EJB 210) lends itself to replication of the data, both geographically and locally. Such replication preferably has the three essential traits of being off-site, application-driven, and accessible. With this level of controlled replication, secondary X:Drive clusters are enabled in geographically diverse locations in order to enhance the reliability of the X:Drive system 100. Consequently, data loss from one data center or even the physical loss of an entire data center would not cause loss of customer data or access. Re-direction would occur dynamically and this information would be replicated in a plurality of sites across the X:Drive system 100, the query or metadata databases provide multiple pointers to the user's data.

In the recovery system 800 of FIG. 8, the recovery system is initially initiated when the MPS Bean 534 is set for a mode to detect mount point recovery at step 804. At step 804, a recover method is called and the external mount point is checked. Query is made at step 806 to evaluate whether or not recovery is already occurring. If recovery is already occurring, an exception is thrown at step 808 and exit is made at this finish point. If recovery is not already occurring, a list of mount points in recovery mode is generated in step 810. Additionally, at step 812 a list of mount points which are down is also generated. Query is made at the evaluation step 818 as to the presence of available recovery objects in the recovery queue. If no such objects are available in the queue, the disk or other database is set into the "up" mode at step 820. The queue for that disk is then unlocked in step 822, and the recovery process is complete at step 824. If at evaluation step 818 recovery objects are still in the queue, evaluation is made as to whether or not the system has gone past the lock count at step 830. If so, the queue for the disk in recovery is locked at step 832 for both the lock count evaluation 830 and the queue lock 832 step, control is then directed to the evaluation step as to whether or not the target file exists 834. If the target file does not exist and the evaluation at step 834 fails, the recovery object is removed from the queue at step 840. The status of the recovery is subsequently put in the request for alert queue at step 842 and return is then made to the query step 818 to determine whether or not objects are still available for recovery in the queue.

If the target file does exist when evaluated at step 834, evaluation is made as to whether or not the request is more current than the file at step 850. If the request is older than the current file, the recovery object is removed from the queue at step 840, and the status for the request is put in the request or alert queue 842 and control returns back to the evaluation step 818 to see if any further recovery objects are available in the recovery queue.

If, in evaluating the request, it is found that the request is more current than the file, the request is submitted to the XDFile object 210 at step 852. The submission of the request to the XDFile object 210 is not recoverable. If the submitted request is successful as indicated by the evaluation at step 854, the recovery object is removed from the queue at step 840, its status is put into the request for alert queue at step 842 and evaluation is made at step 818 as to the presence of any additional recovery objects in the recovery queue. However, if in submitting the request to the XDFile object 210 at step 852 the submission fails, query is made at step 860 as to whether or not the mount point has gone down. If at step 860 the mount point is still up, the request from this mount point is ignored at step 862 and the queue for the disk is unlocked at step 864. Control of the program is then returned to the recovery object availability query in evaluation step 818.

As shown in FIG. 9, the mount point status bean 534 has UP, DOWN, and RECOVERY states. This bean is applicable to the file database 150, as well as user disks 970, 972 as well as recovery disks 974, 976. Additionally, the recovery admin stateful bean 536 is directed towards the recovery database 980 in order to effect the recovery process 800.

In order to effect virus scanning and repair features, the X:Drive system 100 preferably uses the Java® JNI (Java Native Interface) to access a Norton Anti-Virus or other dynamically linked library (NAV.DLL) to scan files for viruses via a Java® servlet. The Java® servlet runs on a Windows™ version X server and can use JNI to make calls to the NAV.DLL dynamically linked libraries. In effect, the Windows™ X machine becomes a specialized NAV.DLL server located at the EJB network layer 124 of the X:Drive system 100, on a sub-network of the resource network. The logic integrating the NAV.DLL dynamic linked libraries with all X:Drive file writes is shown schematically in the flow diagram in FIG. 10.

Figure 10:
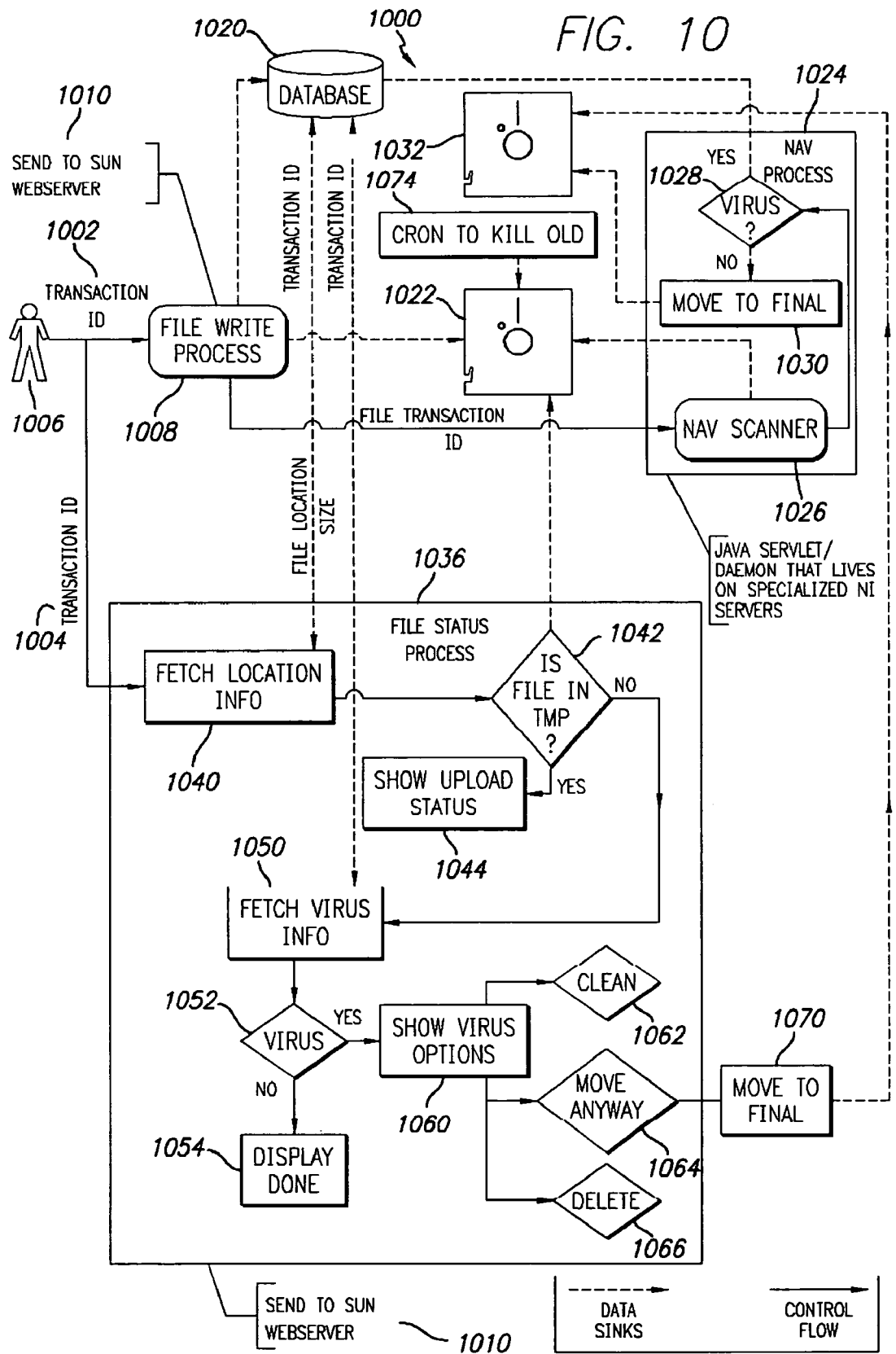
FIG. 10 is a schematic and flowchart diagram showing virus protection effected in the present invention.

As shown in FIG. 10, the virus scanning sub-system 1000 takes the file/transaction ID 1002 and a transaction ID 1004 from a user 1006. The file/transaction ID 1002 is passed to a file write process 1008 executed by a SUN® or other web server 1010. The file is written to both the database generically indicated at reference 1020 and to a temporary file storage area 1022. The file write process 1008 passes the file transaction ID to the Norton Anti-Virus (NAV) process 1024. Within the NAV process 1024 is NAV scanner 1026. The NAV scanner monitors the data stream or otherwise to determine and detect the presence of any viruses. If upon evaluation the NAV process 1024 detects a virus at evaluation step 1028, data sink action is taken with respect to the database 1020. If no virus is detected, the sequence moves to its final termination at step 1030 and data sink action is taken with respect to a temporary file on medium 1032.

While both the file and transaction ID 1002 are delivered to the file write process 1008, the transaction ID alone 1004 is transmitted to a fetch location info step 1040 on a SUN® or other web server 1010. The fetch location info step 1040 transmits its results to an evaluation step 1042, which determines whether or not the file is in the temporary storage area 1022. If the file is in the temporary area, the file's upload status is shown in step 1044. If the file is not in the temporary medium 1022, virus information is fetched at step 1050 in the file status process 1036.

Once the virus information has been fetched, it is evaluated as to whether or not there is a virus present at step 1052. If there is no virus detected, then the virus evaluation terminates and a display of same may be made at step 1054.

However, if evaluation step 1052 indicates the presence of one or more viruses, a plurality of virus options may be shown and presented to the user at step 1060. Among the virus options available are: the cleaning of the virus at step 1062, moving the virus to a different location at step 1064, and/or deleting the virus in step 1066. If step 1064 is taken with the move of the virus-laden file despite its infectious nature is made, movement of the file with its final destination is made in step 1070.

As shown in FIG. 10, a number of data sink actions are taken with respect to information. Additionally, as indicated by FIG. 10, the NAV process 1024 is a separate entity and may be considered to be a JAVA® servlet/daemon living on specialized Windows® NT or other servers.

In order to make resources available on an on-going basis to the virus scanning sub-system 1000 of the present invention, a chron file 1074 (a file executing commands on a periodic basis according to the time) is used to remove old files from a first temporary storage resource 1002.

Figure 11:
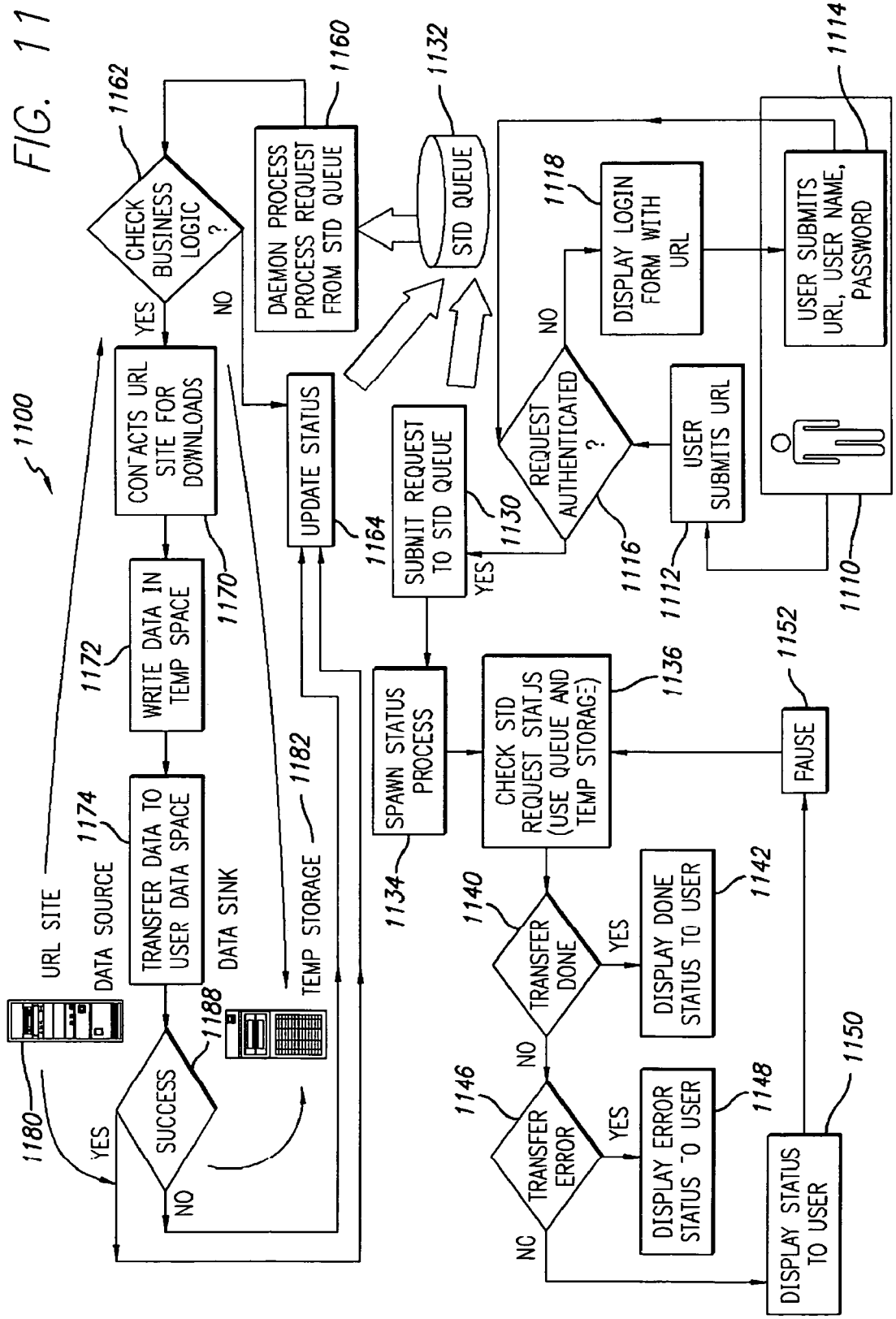
FIG. 11 is a schematic and flowchart diagram of the Internet-to-resource transfer ("Skip the Download"/"Save to My Xdrive") as set forth in the present invention.

FIG. 11 shows the Skip the Download/Save to My Xdrive system where a file on the Internet can be transferred over to an individual's X:Drive at generally data speeds far faster than those available to the end user. This allows the user to exercise dominion and control over the file without having to bear the burden of downloading it to the local computer at the present moment. Once the transfer has taken place across the Internet from the host to the X:Drive system 100, then the user may download the file stored in his X:Drive directory to his local computer at his convenience.

As X:Drive exists on the Internet network, transferring a file from one network resource (such as a web or FTP server) to the user's X:Drive is made much faster from the user's standpoint by by-passing the local connection to the user and allowing the user to submit the transfer request directly to the X:Drive network for execution. The X:Drive system 100 then downloads the requested data from the target server to the user's X:Drive over the presumably higher speed connections of the public Internet.

As shown in FIG. 11, the Save to My Xdrive system 1100 first has the user 1110 submit the URL at step 1112. In order to access the X:Drive system 100 of the present invention, the user submits the URL as well as his or her user name and password at step 1114. Upon submitting the URL and the appropriate verification information, evaluation is made of the information for authentication purposes at step 1116. If the evaluation fails and authentication is not achieved, a login form is displayed in conjunction with the previously-indicated URL at step 1118. If the request is authenticated, it is submitted to the STD/STMX (Skip the Download/Save to My Xdrive) queue 1132 at step 1130. A status process is then spawned at step 1134.

Save to My Xdrive status is then checked on an on-going basis by using the queue in the temporary storage area at step 1136. Query is made as to whether or not the transfer is complete at step 1140. If the transfer is complete at step 1140, then the successful completion is indicated to the user at step 1142. However, if the transfer is not complete, query is made as to the presence of any transfer errors at step 1146. If an error has occurred, an error message is displayed to the user at step 1148. However, if the transfer is incomplete but no errors have occurred, the same is then displayed to the user at step 1150, and a short pause is taken at step 1152 for re-invoking the check STD process at step 1136.

Once the STD queue 1132 receives the request, a daemon process processes the request from the STD queue at step 1160. Query is made as to the business logic of the queued request at step 1162. If the request fails the business logic check 1162, the status is updated at step 1164. Control may transfer back to the STD queue 1132.

If the business logic check succeeds at step 1162, the URL site is contacted by the X:Drive system 100 at step 1170 and the download process is activated. The data transmitted by the URL is then saved in temporary X:Drive space in step 1172, with the data being transferred then to the user data space at step 1174. The URL site 1180 may exist anywhere on the Internet so long as it is available to the X:Drive system 100. In a similar manner, a temporary storage space 1182 may also exist anywhere on the Internet so long as it is accessible and controllable by the X:Drive system 100.

Upon transferring data to the user's data space as shown in step 1174, query is made as to the success of the transfer at step 1188. For either success or failure of the successful file transfer at evaluation step 1188, the status is updated at step 1164 and is passed on to the STD queue 1132 until either success or an error is finally achieved. The status process spawned at step 1130 monitors the update status generated by step 1164 and displays the status to the user during and after the download of the file from the Internet to the user's X:Drive system.

Figure 12:
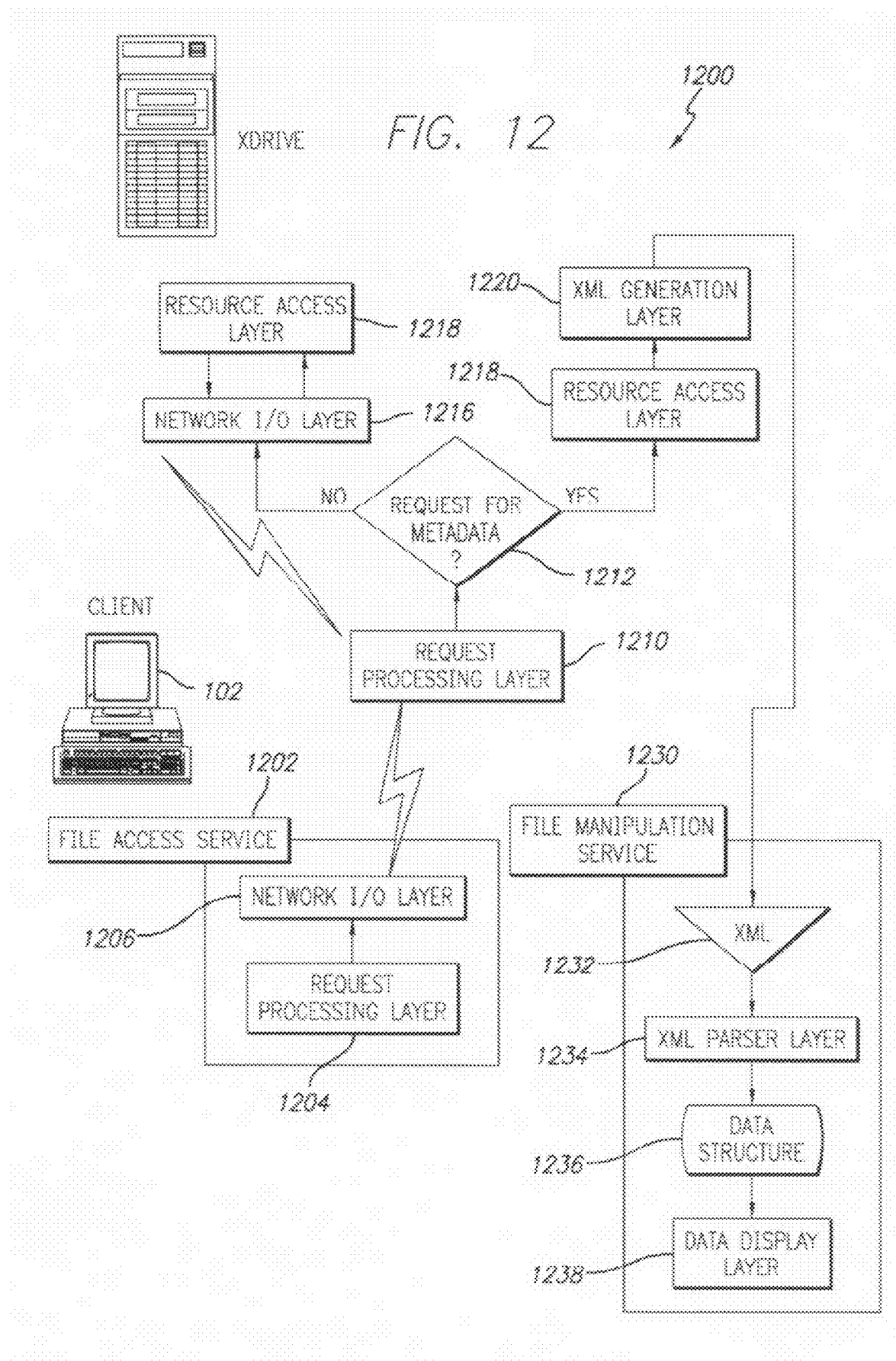
FIG. 12 is a schematic and flowchart diagram of the client system used in the present invention.

FIG. 12 shows a schematic and flowchart diagram for the client system generally used under Microsoft® Windows™ for achieving the present invention. The X:Drive system offers its clients two basic services: a file access service by which files can be uploaded and downloaded to and from X:Drive, as well as a file manipulation service from which file metadata can be obtained and manipulated. Both of these services rely upon the context of their usage. For example, the web client of the present invention uses native upload and download features as well as dialogs in the user's web browsers to facilitate the service.

With the use of the web browsers on the local machine, Windows® X clients use the Windows™ TCP/IP stacks inherently present with the Windows® version X operating system. All the file transfers effected by the X:Drive system can take place as HTTP POST/GET or, preferably, Web-DAV transfers. Generally, two basic layers are present in the file manipulation servers of the X:Drive system 100 of the present invention. An XML parser operates in conjunction with an XML data displayer. By coordinating the two basic layers of the file manipulation service, the server is able to respond with generally the same XML code to all clients. The client is then responsible for converting the XML to a relevant data structure and displaying the XML in an appropriate context. In the present invention, the JavaScript web client receives the XML code and parses it into a JavaScript data structure. A display layer in association with the client and/or browser renders the data structure as an HTML document. The Windows® X client parses the same XML code, but the display layer renders the data structure into a device listing that is understood by the Windows® version X operating system. The importance of this layered architecture is that it generally makes trivial the creation of new clients. Instead of simply creating dynamic web pages (and thus limiting service to web browsers alone), the X:Drive system 100 can enable many platforms, such as operating systems, without altering the server structure. Most platforms come with some sort of XML parsing layers, and many platforms come with display layers ready made. Consequently, the time to market may generally be considered low and efficient establishment and implementation of the X:Drive system 100 of the present invention can be achieved fairly quickly. Additionally, expansion into new platforms generally becomes much quicker as no alteration of the server structure generally needs to occur as Java® and related program functionalities are highly portable from one system to another.

In the client system 1200, as shown in FIG. 12, the client 102 has a file access service 1202, including a request processing layer 1204 coupled to a network I/O layer 1206. Commands and data are then transmitted to the server side of the X:Drive system 100 where the server side request processing layer 1210 transmits the data to a query evaluating whether or not the request is one for metadata at step 1212. If the evaluation fails and the request is not one for metadata, the network I/O layer 1216 and the resource access layer 1218 are invoked in order to provide access to and operation of the transaction database 152.

If the request for metadata query at step 1212 succeeds, the request is passed on to the resource access layer 1218 and on to the XML generation layer 1220. The response to the request from the metadatabase 150 is transmitted to the file manipulation service system 1230 of the client 120. The XML transmitted by the XML generation layer 1220 is received by the file manipulation service 1230 as well as its XML handler 1232. The XML is then passed on to the XML parser layer at step 1234 to arrive at a data structure 1236 that is then ready for display and so is passed on to the data display layer 1238 for display to the user who may then re-initiate the process by implementing the file access service 1202.

An alternative embodiment of I/O (input/output) is "event broadcasting" which may be one of several forms of potential manipulations and/or forms of such I/O. In one embodiment, the X:Drive file system may have an event/subscriber model for file events. For example, when a new file is created, this generates, or initiates, an event which is transmitted the system giving notice and particulars of the event. Interested components of the X:Drive system, namely those that are affected by the event, can subscribe to a topic of events that may include new file creation. When such interested components receive an event, or notice of it, other asynchronous events may be triggered that the event broadcaster has no knowledge about. Consequently, independent or semi-independent operation of interested components can occur with the broadcast of events. Such initiating events can be chosen according to programmer or system preferences as can be the level of resolution, or granularity, of such events (from the very fine to the very broad).

Such event broadcasting may allow, among other things, for services such as: virus scanning, scanning new files for meta-data and inclusion into search indices, thumbnailing graphics for faster web display, adding music files to a personal media library, and other collateral, direct or system-oriented events.

Using the event broadcasting model, the X:Drive system may catch, or detect, new, updated, and deleted files and update a user's meta-data for faster searching, indexing, and richer application support.

Additionally, alternative embodiments may be implemented for a variety of I/O modes. I/O is not strictly for reading and writing files. Over a network, different modes of I/O may be desirable depending upon context.

For example, a user may want to read a music file and may want to access it as a stream, so they can listen to it over the network. Alternatively, the user may want to simply download the music file. The X:Drive system's I/O may be configured to "understand," or otherwise interpret the user's actions or preferences in order to provide for different modes of access depending upon the context.

Figure 13:
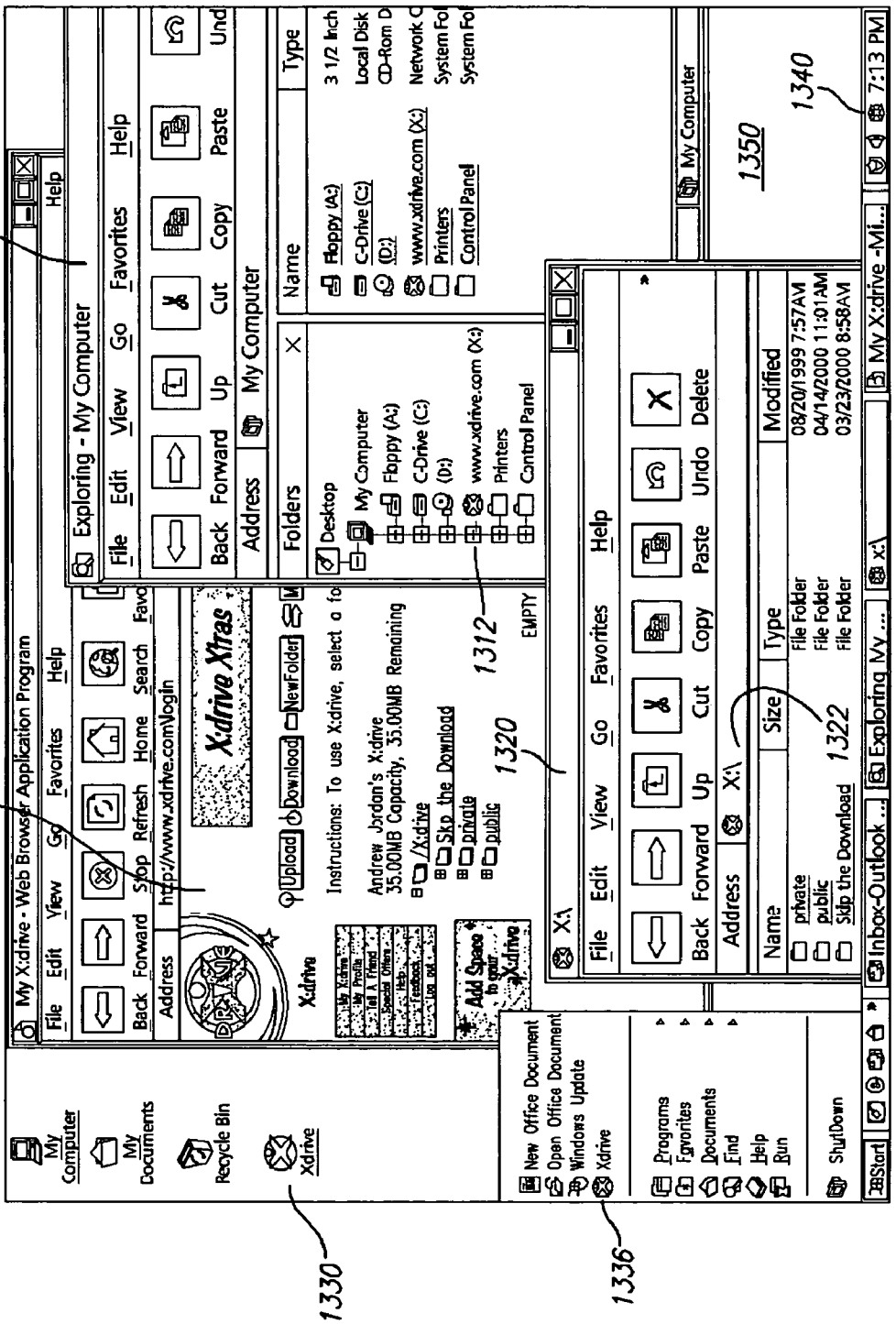
FIG. 13 is a Windows™ desktop display showing both the client and web-browser applications.

FIG. 13 shows the X:Drive system 100 as implemented on a Windows™ X machine, in this case, a Windows '98 machine (an Intel-based personal computer running the Microsoft Windows '98 operating system).

The second frontmost window 1310 of FIG. 13 is headed by the inscription "My Computer" and shows the presence of a drive at logical letter X: 1312 with the X:Drive logo and the label www.X:Drive.com (X:). This is an example of the user interface provided by the client application. The X:Drive system is transparent to the user and functions as any other drive present on the system.

If the user were to click on or activate the X:\ drive on the My Computer window 1310, the second window 1320 appears (partially obscuring the "My Computer" window 1310) and shows the listing under the X:\ Drive. The address of the window 1320 shows the location of the directory as being at X:\ 1322.

Also shown in FIG. 13 is the desktop icon 1330, the start menu icon 1336, and the system tray icon 1340. These icons accompany the client program 102 and provide greater functionality for the user. Each icon serves to activate the client program in accordance with user-settable preferences.

Figure 14:
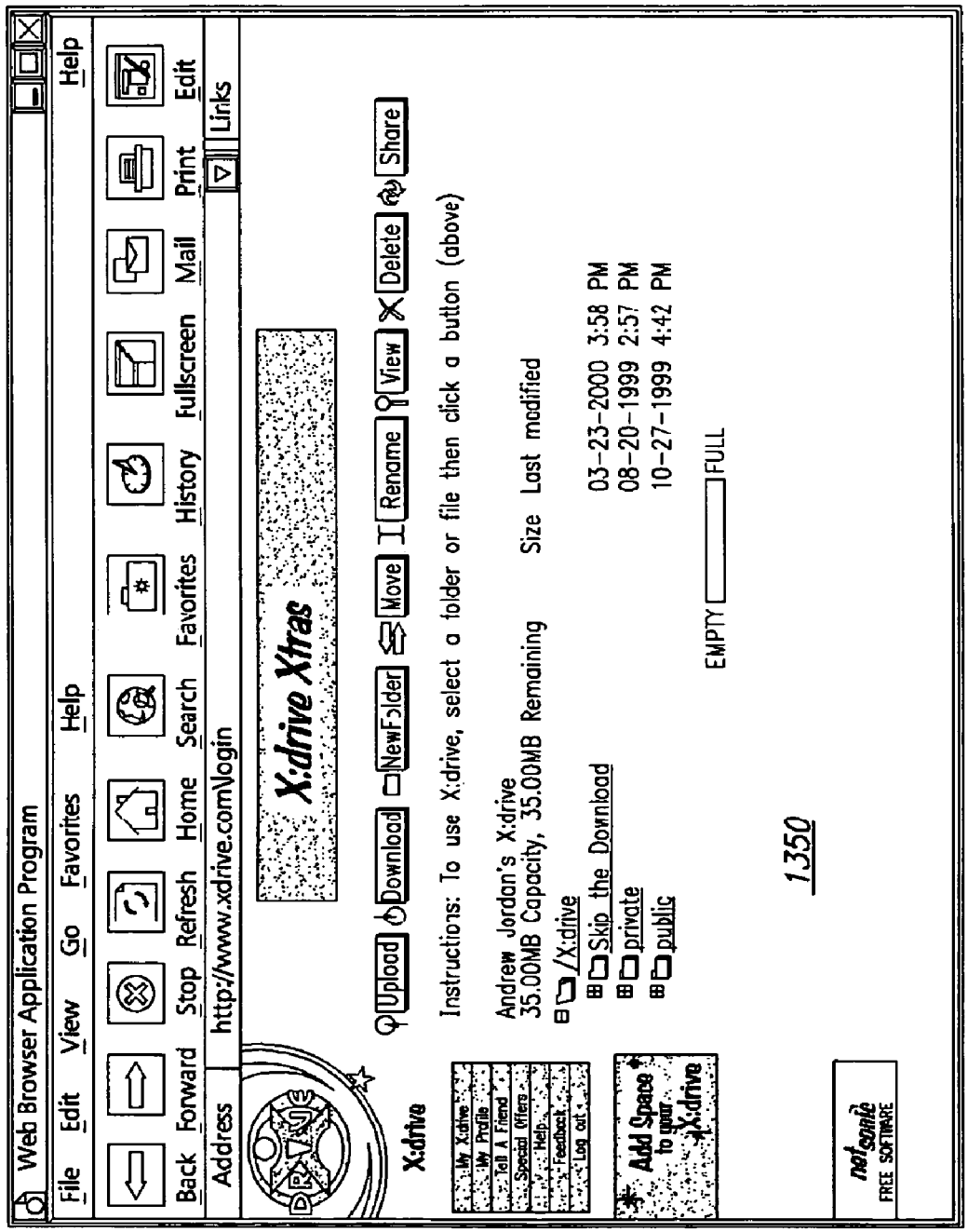
FIG. 14 is a display of a web browser pointing to a user's X:Drive.

FIG. 13 also shows the web-based application 1350 in the background, behind the My Computer 1310 and X:\ 1320 windows. The web-based application window 1350 is shown in FIG. 14. Note should be taken of the exact correspondence between the directory structures of web-based application window 1350 and the client-based application window 1320. This correspondence provides the user with a uniform, familiar, and dependable interface upon with the user can rely.

As set forth above, the three accompanying Appendices are incorporated herein in their entirety, as is the previously filed provisional application.

While the present invention has been described with regards to particular embodiments, it is recognized that additional variations of the present invention may be devised without departing from the inventive concept.

What is claimed is:

1. A client-server system for a network-based data storage and manipulation system, comprising:
    a client system, said client system having a file access service and a file manipulation service;
    a server, said server providing network-based data storage resources and responding to requests transmitted by said client system, said server effecting said requests;
    said file access service having a request processing layer for processing requests and a first network I/O layer for transmitting said requests to said server;
    said server having a second network I/O layer, a resource access layer, and a metadata compiler;
    said second network I/O layer engaged when said requests are not for metadata, said second network I/O layer transmitting requests for file action;
    said resource access layer receiving transmissions from said second network I/O layer and effecting said request, said resource access layer engaged when said requests are for metadata, said resource access layer obtaining and transmitting said metadata;
    said metadata compiler being an XML generator and receiving said metadata from said resource access layer, compiling said metadata, and transmitting said compiled metadata to said client system;
    said server determining if a client request is one for metadata regarding data stored upon said server;
    said first network I/O layer transmitting a signal to said server indicating the presence and nature of at least one of said requests to said server; and
    said server responding to said first I/O layer signal by transmitting one or more additional signals to interested components of the at least one of said requests in order to broadcast said first I/O layer signal;
    said file manipulation service including:
        an XML parser, said XML parser parsing said metadata from said server;
        a data structure, said data structure receiving and preserving parsed data from said XML parser; and
        a data display layer, said data display layer operating upon and displaying said parsed data; whereby
    said metadata is displayable to inform a user about data stored upon said server;
    said server providing said metadata if said client request is for said metadata and transmitting said metadata to said file manipulation service; and
    said server performing a file action if said client request is not for said metadata, said server updating said metadata and transmitting said metadata to said file manipulation service; whereby
    said server appears to a user to operate in a manner similar to operations local to said client system and said client system presents to the user operations on said server in a manner similar to operations local to said client system.

2. The client-server system for a network-based data storage and manipulation system as set forth in claim 1, further comprising:
  said second network I/O layer transmitting a signal to said server indicating the presence and nature of at least one of said requests to said server; and
  said server responding to said second I/O layer signal by transmitting one or more additional signals to interested components of the at least one of said requests in order to broadcast said second I/O layer signal.

3. The client-server system for a network-based data storage and manipulation system as set forth in claim 1, further comprising:
  said second network I/O layer supporting interpretation of said requests transmitted by said client system, said second network I/O layer enabling interpretation of said requests to promote a user's actions or effect said user's preferences.

4. A client-server system for a network-based data storage and manipulation system, comprising:
  a client system, said client system having a file access service and a file manipulation service;
  a server, said server providing network-based data storage resources and responding to requests transmitted by said client system, said server effecting said requests;
  said file access service including a request processing layer for processing requests and a first network I/O layer for transmitting said requests to said server;
  said first network I/O layer transmitting a signal to said server indicating the presence and nature of at least one of said requests to said server and said server responding to said first I/O layer signal by transmitting one or more additional signals to interested components of the at least one of said requests in order to broadcast said first I/O layer signal;
  said server determining if a client request is one for metadata regarding data stored upon said server;
  said file manipulation service including an XML parser, said XML parser parsing said metadata from said server, said file manipulation service also including a data structure, said data structure receiving and preserving parsed data from said XML parser, and said file manipulation service including a data display layer, said data display layer operating upon and displaying said parsed data such that said metadata is displayable to inform about data stored upon said server;
  said server providing said metadata if said client request is for said metadata and transmitting said metadata to said file manipulation service;
  said server providing a second network I/O layer, said second network I/O layer engaged when said requests are not for said metadata, said second network I/O layer transmitting requests for file action, said server also providing a resource access layer, said resource access layer receiving transmissions from said second network I/O layer and effecting said requests, said resource access layer engaged when said requests arc for said metadata, said resource access layer obtaining and transmitting said metadata, and said server providing a metadata compiler in the form of an XML generator, said metadata compiler receiving said metadata from said resource access layer, compiling said metadata, and transmitting said compiled metadata to said client system;
  said second network I/O layer transmitting a signal to said server indicating the presence and nature of at least one of said requests to said server;
  said server responding to said second I/O layer signal by transmitting one or more additional signals to interested components of the at least one of said requests in order to broadcast said second I/O layer signal; and
  said second network I/O layer supporting interpretation of said requests transmitted by said client system, said second network I/O layer enabling interpretation of said requests to promote a user's actions or effect said user's preferences;
  said server performing a file action if said client request is not for said metadata, said server updating said metadata and transmitting said metadata to said file manipulation service such that said server appears to a user to operate in a manner similar to operations local to said client system and said client system presents to the user operations on said server in a manner similar to operations local to said client system.

* * * * *